(12) United States Patent
Urban

(10) Patent No.: US 10,672,222 B2
(45) Date of Patent: Jun. 2, 2020

(54) FLOATING TABLETOP DISPLAY

(71) Applicant: Aristocrat Technologies Australia Pty Limited, North Ryde, NSW (AU)

(72) Inventor: Bruce Urban, Las Vegas, NV (US)

(73) Assignee: ARISTOCRAT TECHNOLOGIES AUSTRALIA PTY LIMITED, North Ryde, NSW (AU)

( * ) Notice: Subject to any disclaimer, the term of this patent is extended or adjusted under 35 U.S.C. 154(b) by 0 days.

(21) Appl. No.: 15/699,532

(22) Filed: Sep. 8, 2017

(65) Prior Publication Data

US 2019/0080547 A1 Mar. 14, 2019

(51) Int. Cl.
| | |
|---|---|
| G07F 17/32 | (2006.01) |
| A47F 5/16 | (2006.01) |
| A63F 13/90 | (2014.01) |
| A47F 7/00 | (2006.01) |
| A63F 13/25 | (2014.01) |
| A47F 5/12 | (2006.01) |
| A47B 21/02 | (2006.01) |
| A63F 13/2145 | (2014.01) |

(52) U.S. Cl.
CPC ............ *G07F 17/322* (2013.01); *A47B 21/02* (2013.01); *A47F 5/12* (2013.01); *A47F 5/16* (2013.01); *A47F 7/0042* (2013.01); *A63F 13/2145* (2014.09); *A63F 13/25* (2014.09); *A63F 13/90* (2014.09); *G07F 17/3216* (2013.01)

(58) Field of Classification Search
None
See application file for complete search history.

(56) References Cited

U.S. PATENT DOCUMENTS

| | | | |
|---|---|---|---|
| 6,005,641 A | 12/1999 | Ui | |
| 2003/0060270 A1 | 3/2003 | Binkley et al. | |
| 2005/0024343 A1* | 2/2005 | Collins | G07F 17/3211 345/173 |
| 2006/0160615 A1* | 7/2006 | Boyd | G07F 17/32 463/30 |
| 2009/0244891 A1* | 10/2009 | Miskin | G06F 1/1601 362/231 |
| 2011/0009189 A1* | 1/2011 | Jordan | G07F 17/3202 463/30 |
| 2012/0178539 A1* | 7/2012 | Cole | G07F 17/3202 463/46 |
| 2012/0220363 A1 | 8/2012 | Bytnar et al. | |

OTHER PUBLICATIONS

"Bartop U1", Gaming Today, Nov. 2, 2010. 2 Pages. https://www.gamingtoday.com/Fantasy/industry/article/28064-Bartop_U1.
U1 Gaming, Machines, Copyright 2017. Accessed Aug. 2019. 1 Page. http://u1gaming.com/machines.html.

* cited by examiner

*Primary Examiner* — Damon J Pierce
(74) *Attorney, Agent, or Firm* — Armstrong Teasdale LLP

(57) ABSTRACT

A tabletop display is provided, having a tabletop surface and a monitor spaced from the tabletop surface and angled obliquely with respect to the tabletop surface. The monitor defines a front, display surface and an opposing back surface. The tabletop display also includes a column extending from the tabletop surface to the back surface of the monitor, an input mechanism comprising an input aperture spaced from the tabletop surface, and an output mechanism comprising an output aperture spaced from the tabletop surface.

31 Claims, 17 Drawing Sheets

FLOATING TABLETOP DISPLAY

BACKGROUND

The embodiments described herein relate generally to gaming machines and, more particularly, to a floating tabletop gaming display.

At least some known tabletop/bartop gaming machines have displays and player interaction elements (e.g., buttons, input/output mechanisms) arranged in fixed-space, rigid housing due to historical form factors. Such arrangements allow little variability between machines and may limit the size of the display and the relative locations where player interaction elements can be located, with respect to a tabletop/bartop surface and/or with respect to the display. For example, when an angled display is contained within such a fixed-space housing, a horizontal area available for player interaction elements (and for food/drinks/etc.) can be limited. Moreover, such fixed-space housings limit the size and orientation of the display therein.

BRIEF DESCRIPTION

In one aspect, a tabletop display includes a tabletop surface and a monitor spaced from the tabletop surface and angled obliquely with respect to the tabletop surface. The monitor defines a front, display surface and an opposing back surface. The tabletop display also includes a column extending from the tabletop surface to the back surface of the monitor, an input mechanism including an input aperture spaced from the tabletop surface, and an output mechanism including an output aperture spaced from the tabletop surface.

In another aspect, a tabletop display includes a tabletop surface and a monitor spaced from the tabletop surface and angled obliquely with respect to the tabletop surface. The monitor defines a front, display surface and an opposing back surface. The tabletop display also includes a column extending from the tabletop surface to the back surface of the monitor, at least one lighting device coupled to the back surface of the monitor, and at least one control for adjusting a lighting output of the lighting device.

In yet another aspect, a tabletop gaming system includes a plurality of tabletop displays. Each tabletop display respectively includes a tabletop surface, and a monitor spaced from the tabletop surface and angled obliquely with respect to the tabletop surface. The monitor defines a front, display surface and an opposing back surface. Each tabletop display also includes a column extending from the tabletop surface to the back surface of the monitor, an input mechanism including an input aperture spaced from the tabletop surface, and an output mechanism including an output aperture spaced from the tabletop surface.

In a further aspect, a gaming machine includes a base having a horizontal base top surface coplanar with a top surface of a frame surrounding the base. The gaming machine also includes a primary display surface spaced a distance from the base top surface and oriented obliquely with respect to the base top surface, and at least one of an input mechanism and an output mechanism defined in at least one of the frame top surface and the base top surface.

In a still further aspect, a gaming machine includes a base having a horizontal base top surface coplanar with a top surface of a frame surrounding the base. The gaming machine also includes a primary display surface spaced a distance from the base top surface by a column, the primary display surface oriented obliquely with respect to the base top surface. The gaming machine also includes at least one of an input mechanism and an output mechanism defined in the column.

In another aspect, a method of retrofitting a gaming system includes removing a first gaming machine from a gaming system frame, the first gaming machine including a first base defining a first footprint of the first gaming machine. The method also includes inserting a second gaming machine into the gaming system frame. The second gaming machine includes a second base defining a second footprint of the second gaming machine, the second footprint the same as the first footprint, and a base top surface coplanar with a top surface of the gaming system frame. The second gaming machine further includes a monitor extending a distance above the base top surface and spaced from the base top surface by a column.

BRIEF DESCRIPTION OF THE DRAWINGS

The embodiments described herein may be better understood by referring to the following description in conjunction with the accompanying drawings.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are intended to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to gaming machine embodiments providing player comfort and ergonomic considerations in industrial, commercial, and residential applications.

The following description refers to the accompanying drawings, in which, in the absence of a contrary representation, the same numbers in different drawings represent similar elements.

A tabletop/bartop gaming system including a "floating" or "suspended" tabletop/bartop display is described. The floating tabletop display includes a horizontal "tabletop" surface, and a monitor that is spaced a distance above the tabletop surface and that is angled obliquely with respect to the tabletop surface. The monitor defines a front, display surface and an opposing back surface. The floating tabletop display also includes a column extending from the tabletop surface to the back surface of the monitor, as well an input mechanism and an output mechanism that include respective apertures spaced from the tabletop surface.

Figure 1:
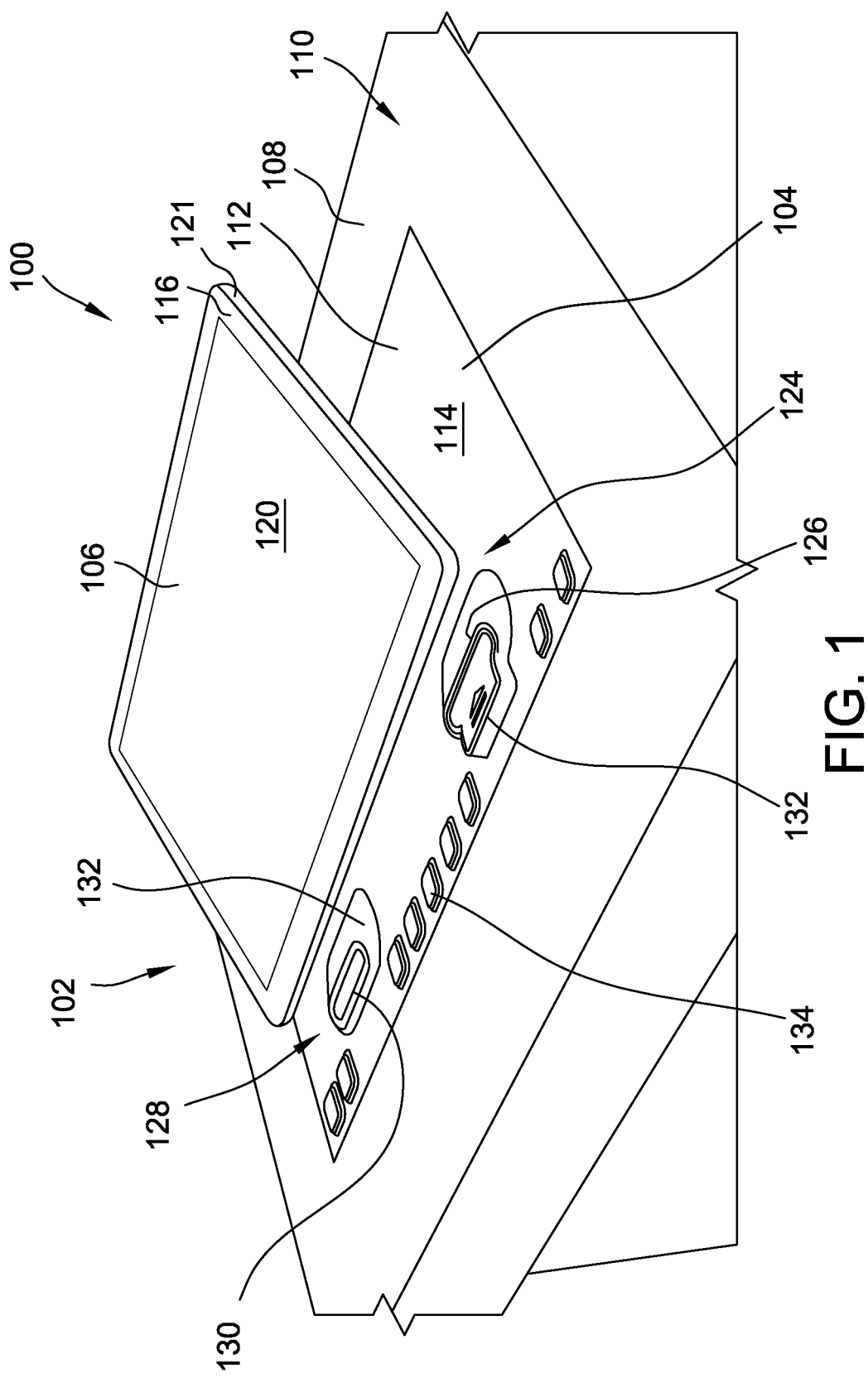
FIG. 1 is a front perspective view of a tabletop/bartop gaming system including a first exemplary embodiment of a tabletop/bartop display.
Figure 2:
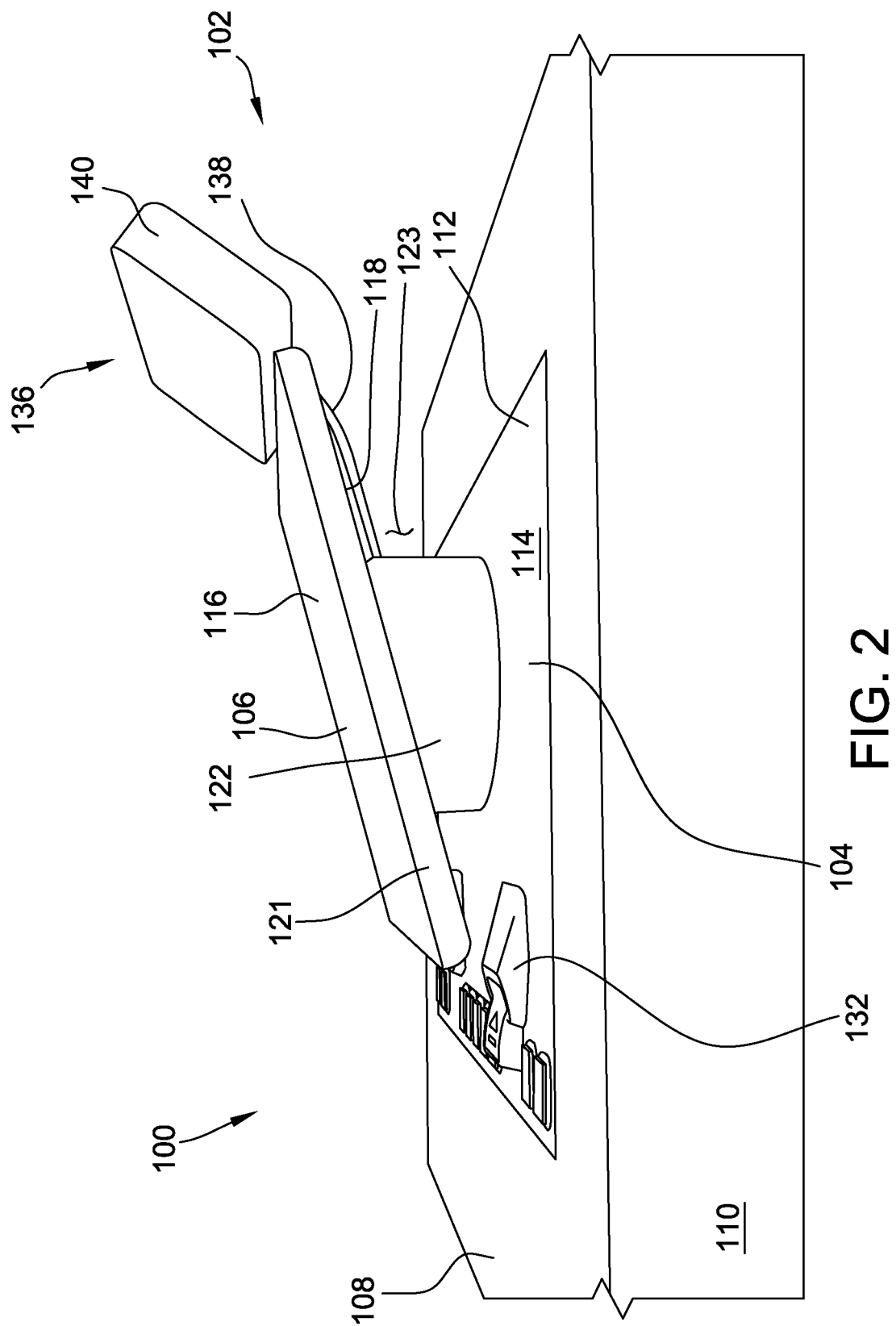
FIG. 2 is a side view of the tabletop display shown in FIG. 1.

Referring now to the figures, FIG. 1 is a front perspective view of an exemplary tabletop gaming system 100 including an exemplary floating tabletop display 102. Floating tabletop display 102 may be understood to be and/or referred to as a "station" of tabletop gaming system 100. FIG. 2 is a side view of floating tabletop display 102. In the exemplary embodiment, floating tabletop display 102 includes a horizontal top surface 104, referred to generally as a "tabletop surface" 104, and a monitor 106 spaced therefrom. Tabletop surface 104 is a generally horizontal, planar surface. Tabletop surface 104 is at least partially defined by a top surface 112 of a gaming machine base 114, which is co-planar with a top surface 108 of a gaming system frame 110. Generally, frame 110 functions as a housing for the particular base 114 installed therein, such that frame 110 at least partially surrounds base 114. Where frame 110 includes at least a portion of a bar, frame top surface 108 may include a bartop surface. Base 114 is the base of the gaming machine installed in a particular "station" and includes at least some components necessary to provide game play at tabletop gaming system 100. Base 114 includes tabletop surface 104 and monitor 106, as well as internal hardware and/or computing components. Base 114 may be exchangeable for an alternative base 114 that may provide alternative games, or for maintenance purposes.

Monitor 106 defines a front surface 116 and a back surface 118, where front surface 116 is generally a display surface and may be referred to as a "primary display surface." Back surface 118 opposes front surface 116. More specifically, front surface 116 includes a display 120 that may include one or more screens and/or one or more display regions suitable to display at least one game (e.g., card games, reel-type games, etc.). Display 120 may include, without limitation, a plasma display, a liquid crystal display (LCD), a TFT LCD (Thin-Film-Transistor Liquid Crystal Display), a display based on light emitting diodes (LEDs), organic light emitting diodes (OLEDs), polymer light emitting diodes (PLEDs), and/or surface-conduction electron emitters (SEDs), a speaker, an alarm, and/or any other device capable of presenting information to a user/player (not shown). Display 120 may include one or more touch screen regions such that a player may interact with the game via the touch screen region(s). In addition, although monitor front surface 116 is illustrated as a flat or planar display, in one or more alternative embodiments, monitor 106 may include a curved or arcuate front surface 116 or display 120. In some embodiments, display 120 may extend to a perimeter 121 of monitor 106, to increase a display area and/or a playable surface of display 120. For example, display 120 may accommodate a 23-inch screen, as opposed to a smaller screen that may be used in some typical gaming systems.

Monitor 106 is spaced from tabletop surface 104 by a column 122 that extends between monitor back surface 118 to tabletop surface 104. Monitor 106 is angled obliquely with respect to tabletop surface 104, such the primary display surface defined by monitor front surface 116 is also angled obliquely with respect to the generally planar, horizontal tabletop surface 104. In the illustrated embodiment, column 122 may be made from any suitable material that may withstand a weight of monitor 106 as well as additional force applied by a user when interacting with monitor 106 (e.g., touching display 120, leaning on monitor 106, etc.). Column 122 is distinguished from an enclosure or housing that spans from monitor 106 to tabletop surface 104 in typical gaming systems. More particularly, spacing monitor 106 from tabletop surface 104 by column 122 makes available an entire volume of space 123 between monitor 106 and tabletop surface 104. As shown and described herein, a plurality of gaming system elements may be arranged within and about such a volume of space 123, increasing a flexibility and variety of potential gaming system designs. Volume of space 123 may be considered open and/or empty, and/or space 123 between monitor 106 and tabletop surface 104 may be considered open, empty, and/or accessible, in that no housing covers or obscures volume of space 123. Opening volume of space 123 may further facilitate increasing the display area and/or a playable surface of display 120, as more of tabletop surface 104 is available for positioning gaming system elements (e.g., an input mechanism or output mechanism, described herein, buttons, lighting, etc.).

Floating tabletop display 102 also includes an input mechanism 124 such that a user may input one or more credits (e.g., physical credits and/or physical items associated with virtual credits) to tabletop gaming system 100 for play of a game thereat. Input mechanism 124 may include at least one of a coin input chute, a bill validator, a ticket reader, and a card reader. In the exemplary embodiment, input mechanism 124 defines an input aperture 126 for receipt of the physical credits and/or physical item. More particularly, input aperture 126 is spaced from tabletop surface 104, thereby reducing the likelihood that detritus, debris, and/or liquids (e.g., spilled drinks or foods) will enter input aperture 126 and damage input mechanism 124.

In addition, floating tabletop display 102 includes an output mechanism 128 such that a user may receive a credit output at the end of play of a game. Output mechanism 128 may include at least one of a coin tray, a bill dispenser, and a ticket printer. In the exemplary embodiment, output mechanism 128 defines an output aperture 130 for dispensing of the credit output. More particularly, output aperture 130 is spaced from tabletop surface 104, thereby reducing the likelihood that detritus, debris, and/or liquids (e.g., spilled drinks or foods) will enter output aperture 130 and damage output mechanism 128.

In the exemplary embodiment, input mechanism 124 and output mechanism 128 are arranged on tabletop surface 104. Input mechanism 124 and output mechanism 128 may be considered to be defined, at least in part, in tabletop surface 104. In an alternative embodiment, input mechanism 124 and output mechanism 128 may be arranged on and/or defined, at least in part, in frame top surface 108. Input aperture 126 and output aperture 130 are raised above tabletop surface 104 by respective projections or ridges 132 that extend above tabletop surface 104. Moreover, in the exemplary embodiment, projections 132 are oriented such that input and output apertures 126, 130 are angled obliquely with respect to horizontal tabletop surface 104.

Tabletop surface 104 also includes a plurality of buttons 134 for interaction with floating tabletop display 102 by a user. In the illustrated embodiment, buttons 134 are embodied as traditional physical buttons. In one or more alternative embodiments, buttons 134 are embodied as virtual buttons, such as touch regions of a touch-screen display.

With reference to FIG. 2, floating tabletop display 102 may further include one or more player tracking devices 136. In the exemplary embodiment, player tracking device 136 includes a stem 138 and a player interaction portion 140 coupled to stem 138. Stem 138 is coupled to column 122 and extends such that player interaction portion 140 is accessible to a player above monitor 106. Player interaction portion 140 may include, for instance, a secondary display, input/output devices, player tracking computing elements, and/or any other suitable elements. Although player tracking device 136 is shown as extending above monitor 106, it should be readily understood that stem 138 may extend from column 122 to position player interaction portion 140 below, beside, or otherwise oriented with respect to monitor 106.

Figure 3:
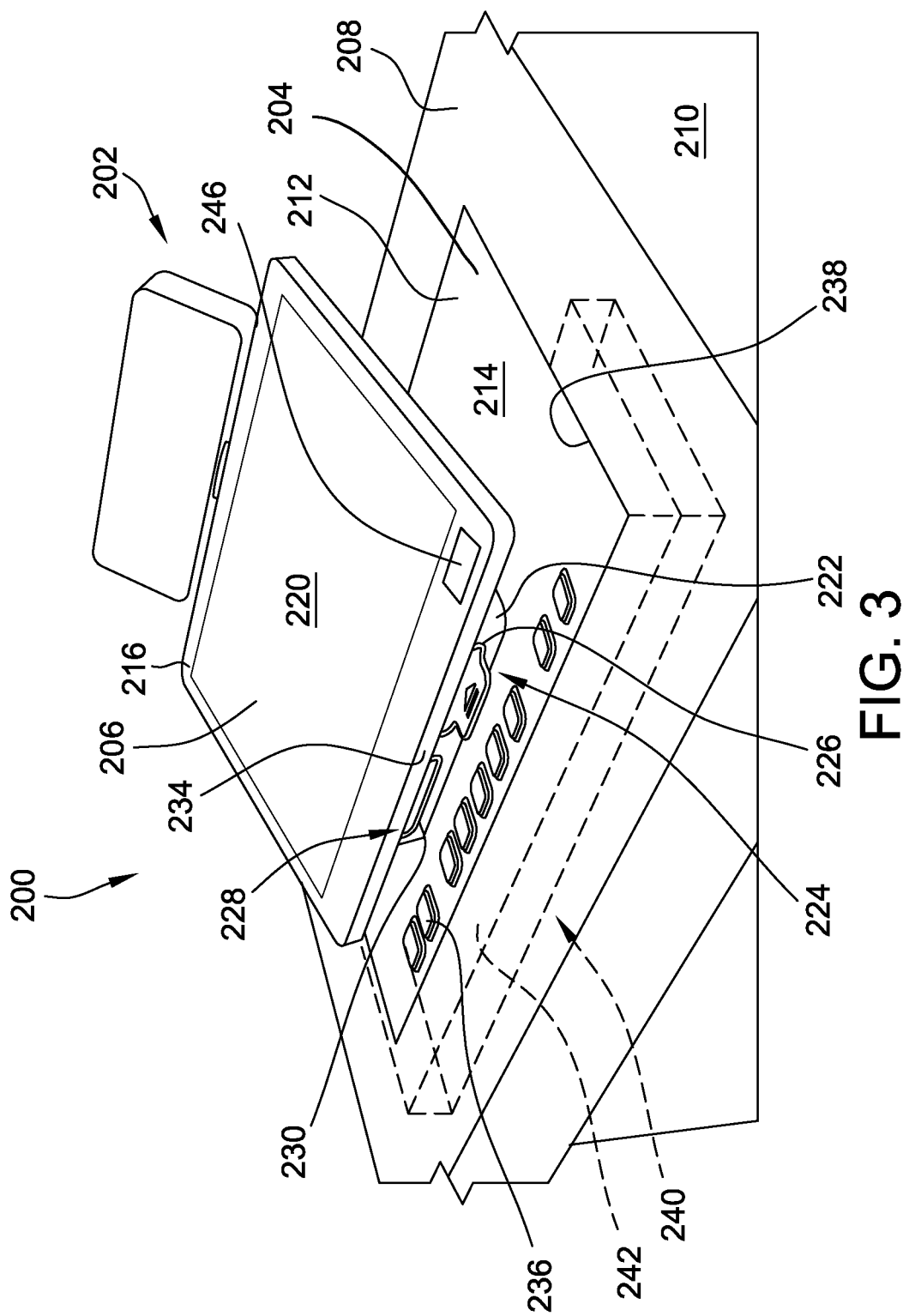
FIG. 3 is a front perspective view of a second exemplary embodiment of a tabletop display.
Figure 4:
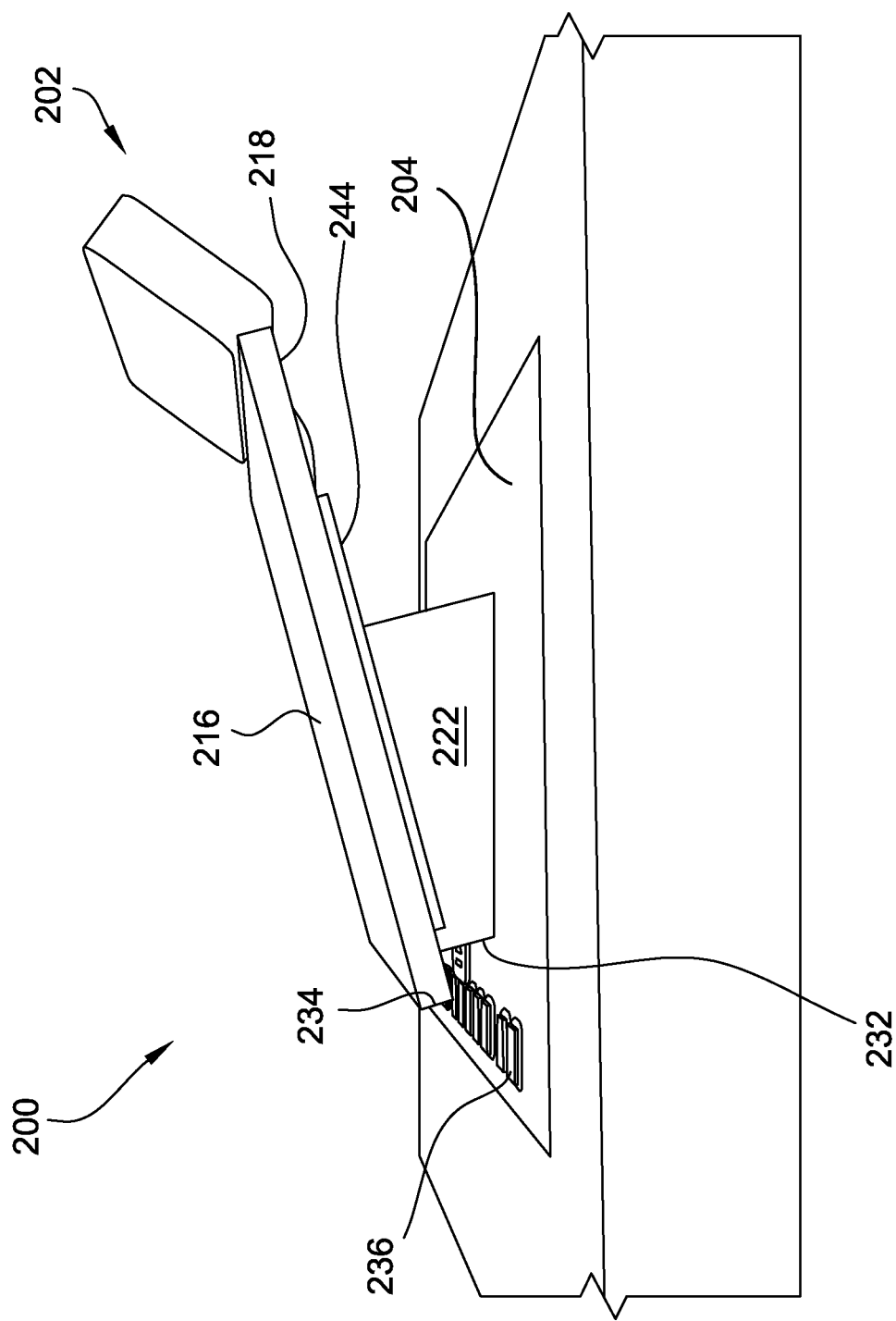
FIG. 4 is a side view of the tabletop display shown in FIG. 3.

FIG. 3 is a front perspective view of an exemplary tabletop gaming system 200 including an exemplary floating tabletop display 202. FIG. 4 is a side view of floating tabletop display 202. Floating tabletop display 202 may be similar to floating tabletop display 102 (shown in FIGS. 1 and 2). In the exemplary embodiment, floating tabletop display 202 includes a tabletop surface 204 and a monitor 206 spaced therefrom. Tabletop surface 204 is at least partially defined by a top surface 212 of a gaming machine base 214, which is co-planar with a top surface 208 of a gaming system frame 210, as described herein.

Monitor 206 defines a front surface 216 and a back surface 218, where front surface 216 is generally a display surface and back surface 218 opposes front surface 216. More specifically, front surface 216 includes a display 220 that may include one or more screens and/or one or more display regions suitable to display at least one game (e.g., card games, reel-type games, etc.). Display 220 may include one or more touch screen regions such that a user may interact with the game via the touch screen region(s).

Monitor 206 is spaced from tabletop surface 204 by a column 222 that extends between monitor back surface 218 to tabletop surface 204. In the illustrated embodiment, column 222 may be made from any suitable material that may withstand a weight of monitor 206 as well as additional force applied by a user when interacting with monitor 206 (e.g., touching display 220, leaning on monitor 206, etc.).

Floating tabletop display 202 also includes an input mechanism 224, as described herein. In the exemplary embodiment, input mechanism 224 defines an input aperture 226 for receipt of a physical credit and/or other physical items associated with credits. Input aperture 226 is spaced from tabletop surface 204, thereby reducing the likelihood that detritus, debris, and/or liquids (e.g., spilled drinks or foods) will enter input aperture 226 and damage input mechanism 224. In addition, floating tabletop display 202 includes an output mechanism 228, as described herein. In the exemplary embodiment, output mechanism 228 defines an output aperture 230 for dispensing of credit output. Output aperture 230 is spaced from tabletop surface 204, thereby reducing the likelihood that detritus, debris, and/or liquids (e.g., spilled drinks or foods) will enter output aperture 230 and damage output mechanism 228.

In the exemplary embodiment, input mechanism 224 and output mechanism 228 are coupled to column 222. More particularly, input aperture 226 and output aperture 230 are defined in a front surface 232 of column 222. As such, input aperture 226 and output aperture 230 are raised above tabletop surface 204. In such an embodiment, input aperture 226 and output aperture 230 are oriented substantially perpendicular to tabletop surface 204 and are angled obliquely with respect to monitor 206 (or vice versa). In addition, in the exemplary embodiment, monitor 206 extends in a forward direction beyond column front surface 232. For example, a front edge 234 of monitor 206 extends past column front surface 232. Monitor front edge 234 thereby extends beyond input aperture 226 and output aperture 230, which may further facilitate the prevention of detritus, debris, and/or liquids from entering input aperture 226 and/or output aperture 230.

Tabletop surface 204 also includes a plurality of buttons 236 for interaction with tabletop gaming system 200 by a user. In the illustrated embodiment, buttons 236 are embodied as traditional physical buttons. In one or more alternative embodiments, buttons 236 are embodied as virtual buttons, such as touch regions of a touch-screen display. In addition, tabletop surface 204 and/or frame top surface 208 includes one or more openings or channels 238. In the exemplary embodiment, channels 238 extend between tabletop surface 204 and frame top surface 208, and/or in locations around the plurality of buttons 236. In embodiments in which input aperture 226 and/or output aperture 230 are arranged on tabletop surface 204, channels 238 may also extend in locations around input aperture 226 and/or output aperture 230. Frame 210 and/or gaming machine base 214 further includes a drain system 240 in fluid communication with channels 238. When liquids are poured or spilt on tabletop surface 204 and/or frame top surface 208, channels 238 enable the liquid to flow into drain system 240. Specifically, drain system 240 may include a trough 242 or similar suitable structure that is sized and oriented to catch or collect any liquid that flows through channels 238. Although not specifically shown, base 214 and/or frame 210 may include one or more doors or other access structures that permit access to drain system 240 for emptying and/or cleaning. Accordingly, tabletop surface 204 and/or any gaming elements disposed thereon (e.g., buttons, apertures, etc.) may be at least partially protected from damage due to liquids thereon.

In addition, as shown in FIG. 4, floating tabletop display 202 includes at least one lighting device 244 coupled to monitor back surface 218. Lighting device 244 may include, for example, an LED lighting device or other suitable lighting device. Floating tabletop display 202 further includes at least one control 246 for changing a lighting output of lighting device 244. In the exemplary embodiment, control 246 is provided on monitor 206, outside of or separate from display 220, as a button or touch-based control. In other embodiments, control 246 may be one or more buttons or other control elements disposed on or one or more of tabletop surface 204, column 222, and monitor 206 (including display 220). Lighting device 244 may be controlled to change one or more of a color output, brightness/intensity, and lighting pattern of lighting device 244. For example, a user may use control 246 to change a color output of lighting device 244 to signal to another person. In one particular example, changing the color output of lighting device 244 signals to a bartender or other service employee that the user of floating tabletop display 202 needs assistance. Lighting device 244 may also be controlled automatically in response to one or more events that occur at floating tabletop display 202, such as game events, expiration of a promotional period, depletion of available credit, etc. In some embodiments, lighting device(s) 244 may be additionally or alternatively coupled to other parts of monitor 206, to column 222, and/or to tabletop surface 204.

Figure 5:
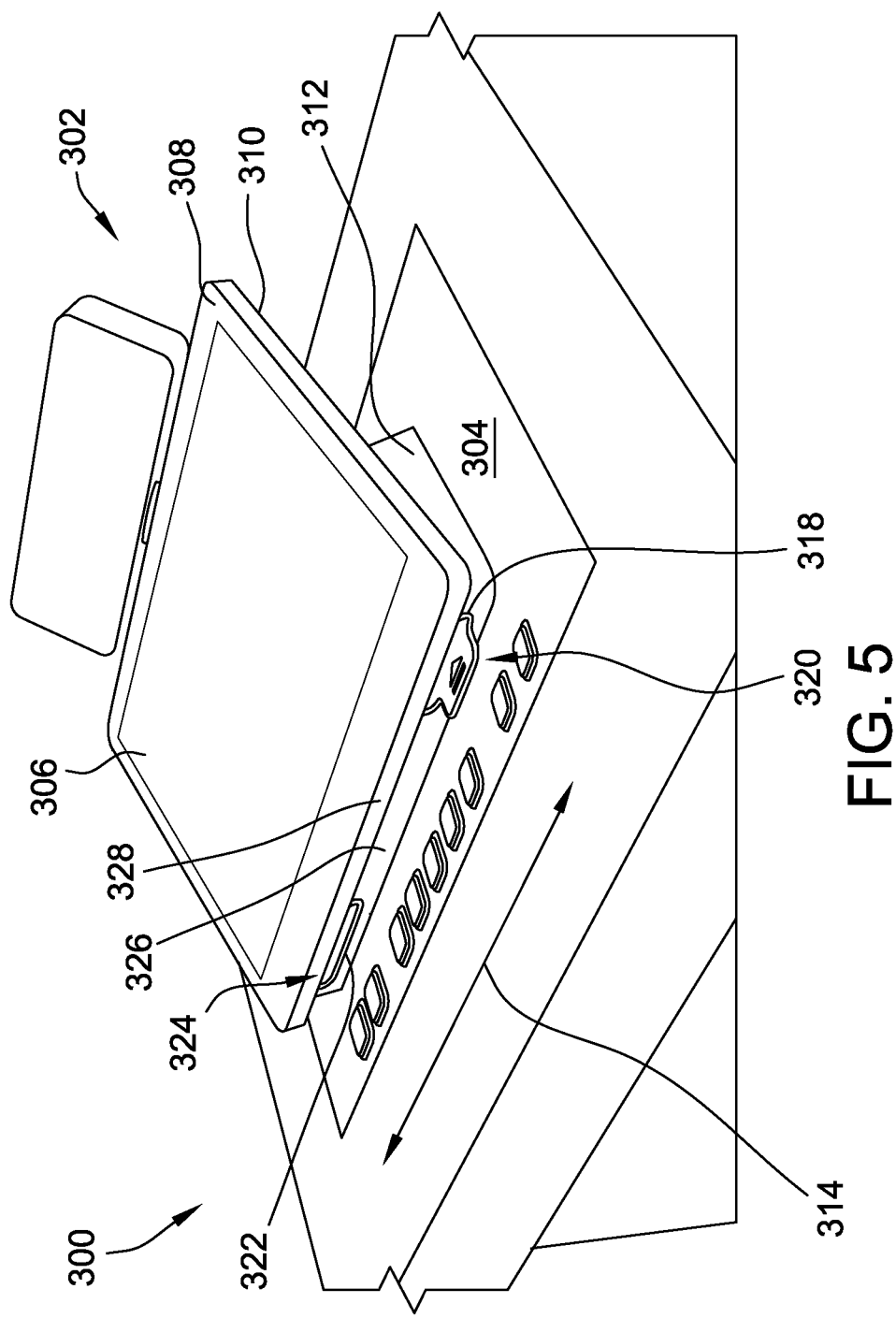
FIG. 5 is a front perspective view of a third exemplary embodiment of a tabletop display.
Figure 6:
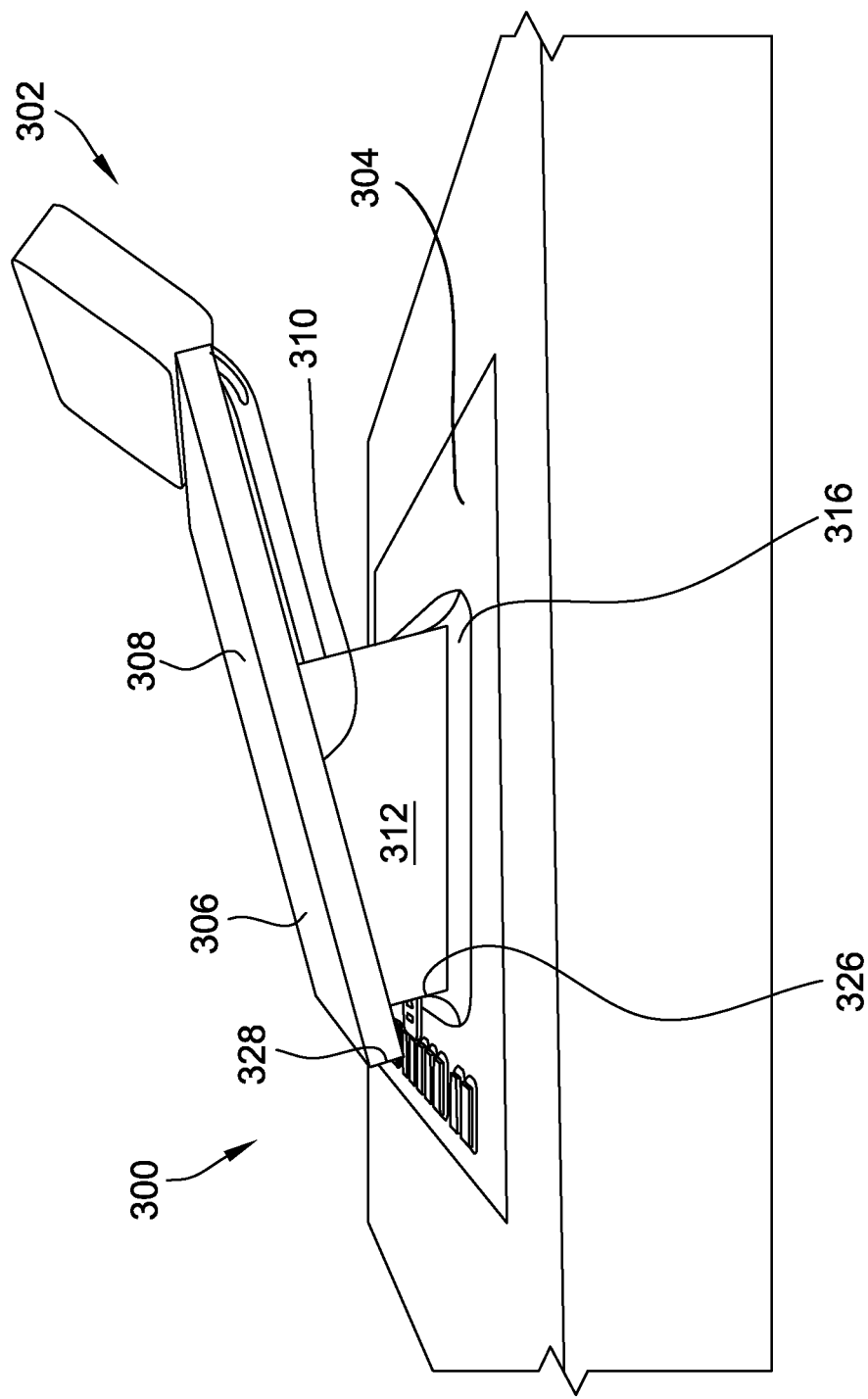
FIG. 6 is a side view of the tabletop display shown in FIG. 5.

FIG. 5 is a front perspective view of an exemplary tabletop gaming system 300 including an exemplary floating tabletop display 302. FIG. 6 is a side view of floating tabletop display 302. Floating tabletop display 302 may be substantially similar to floating tabletop display 102 (shown in FIGS. 1 and 2) and/or floating tabletop display 202 (shown in FIGS. 3 and 4). Specifically, in the exemplary embodiment, floating tabletop display 302 includes a tabletop surface 304 and a monitor 306 spaced therefrom. Monitor 306 defines a front surface 308 and a back surface 310, where front surface 308 is generally a display surface and back surface 310 opposes front surface 308. Monitor 306 is spaced from tabletop surface 304 by a column 312 that extends between monitor back surface 310 to tabletop surface 304. In the illustrated embodiment, column 312 may be made from any suitable material that may withstand a weight of monitor 306 as well as additional force applied by a user when interacting with monitor 306. In addition, in the exemplary embodiment, column 312 extends, along a widthwise direction 314, further than column 222 (shown in FIGS. 3 and 4). The wider column 312 may facilitate strengthening floating tabletop display 302 and preventing damage from excessive force being applied to monitor 306. In addition, as shown in FIG. 6, column 312 includes a flared base or foot 316. Foot 316 may facilitate further strengthening of floating tabletop display 302 and/or may be provided for aesthetic purposes.

In the illustrated embodiment, similar to floating tabletop display 202, an input aperture 318 of an input mechanism 320 is positioned on column 312, and an output aperture 322 of an output mechanism 324 is positioned on column 312. Specifically, each of input aperture 318 and output aperture 322 are positioned on a front surface 326 of column 312, facing a player (not shown). A front edge 328 of monitor 306 extends forwardly past column front surface 326, which may facilitate the prevention of detritus, debris, and/or liquids from entering input aperture 318 and/or output aperture 322. Input aperture 318 and output aperture 322 are arranged at opposing ends (in widthwise direction 314) of monitor 306.

Figure 7:
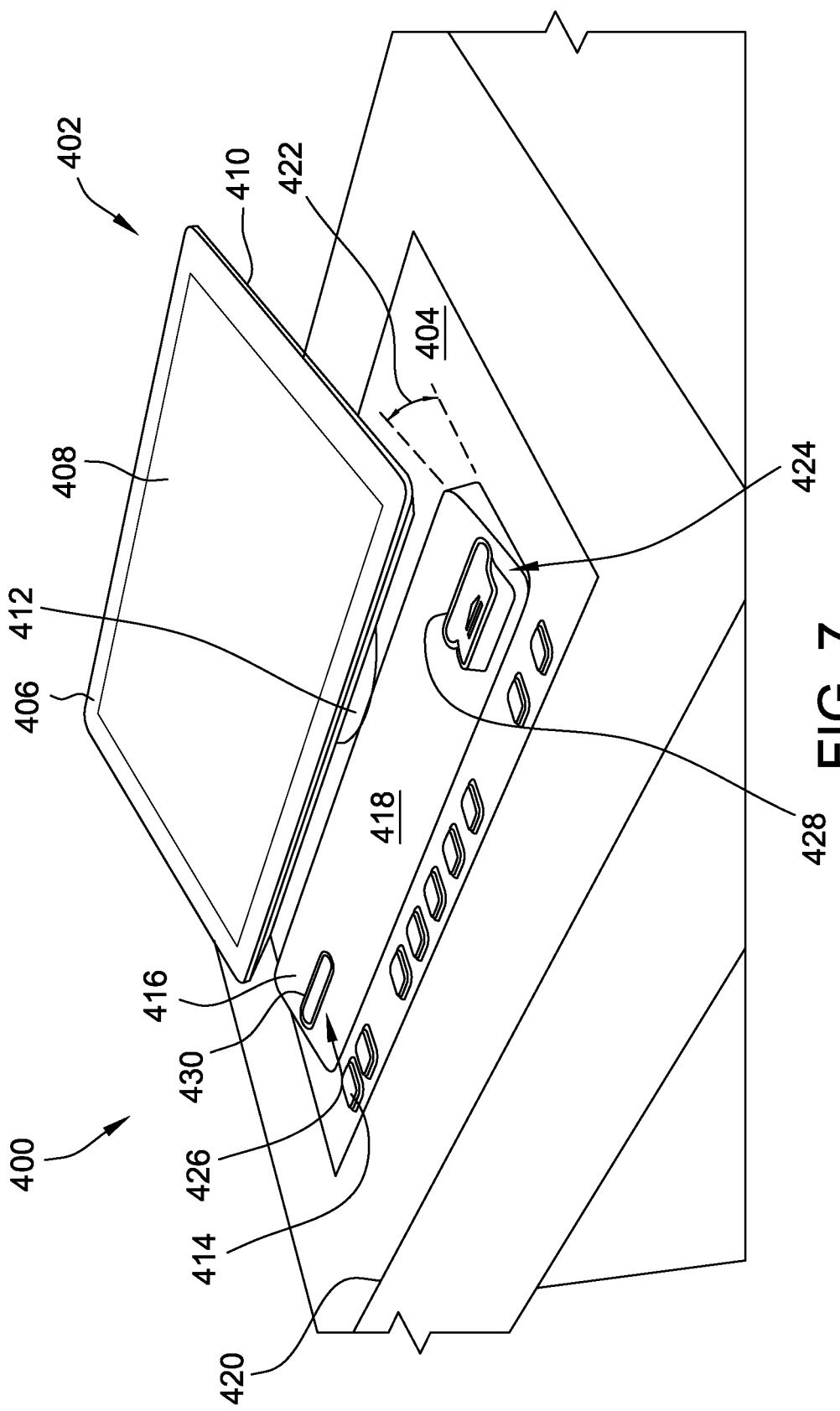
FIG. 7 is a front perspective view of a fourth exemplary embodiment of a tabletop display.

FIG. 7 is a front perspective view of an exemplary tabletop gaming system 400 including an exemplary floating tabletop display 402. Floating tabletop display 402 may be similar to floating tabletop display 102 (shown in FIGS. 1 and 2), floating tabletop display 202 (shown in FIGS. 3 and 4), and/or floating tabletop display 302 (shown in FIGS. 5 and 6). Specifically, in the exemplary embodiment, floating tabletop display 402 includes a tabletop surface 404 and a monitor 406 spaced therefrom. Monitor 406 defines a front surface 408 and a back surface 410, where front surface 408 is generally a display surface and back surface 410 opposes front surface 408. Monitor 406 is spaced from tabletop surface 404 by a column 412 that extends between monitor back surface 410 and tabletop surface 404.

In the exemplary embodiment, tabletop surface 404 includes a plurality of buttons 414 for interaction with tabletop gaming system 400 by a user. In the illustrated embodiment, buttons 414 are embodied as traditional physical buttons. In one or more alternative embodiments, buttons 414 are embodied as virtual buttons, such as touch regions of a touch-screen display. In addition, tabletop surface 404 includes a panel 416 extending obliquely therefrom. More particularly, panel 416 is positioned forward of column 412 and is angled with respect to tabletop surface 404 such that a primary face 418 of panel 416 is oriented towards a front 420 of tabletop surface 404, or towards the player. A plane of primary face 418 forms an angle 422 with tabletop surface 404.

Floating tabletop display 402 also includes an input mechanism 424 and an output mechanism 426, as described herein. In the exemplary embodiment, input mechanism 424 and output mechanism 426 are coupled to panel 416. More particularly, an input aperture 428 of input mechanism 424 and an output aperture 430 of output mechanism 426 are defined in primary face 418 of panel 416. As such, input and output apertures 428, 430 are raised above tabletop surface 404. Moreover, in the exemplary embodiment, as panel 416 is oriented obliquely with respect to horizontal tabletop surface 404, input and output apertures 428, 430 are also angled obliquely with respect to tabletop surface 404.

In other embodiments, panel 416 may include additional, fewer, or alternative features, such as one or more buttons 414, one or more display areas, lighting features, controls, a player tracking device, and/or other features of gaming devices.

Figure 8:
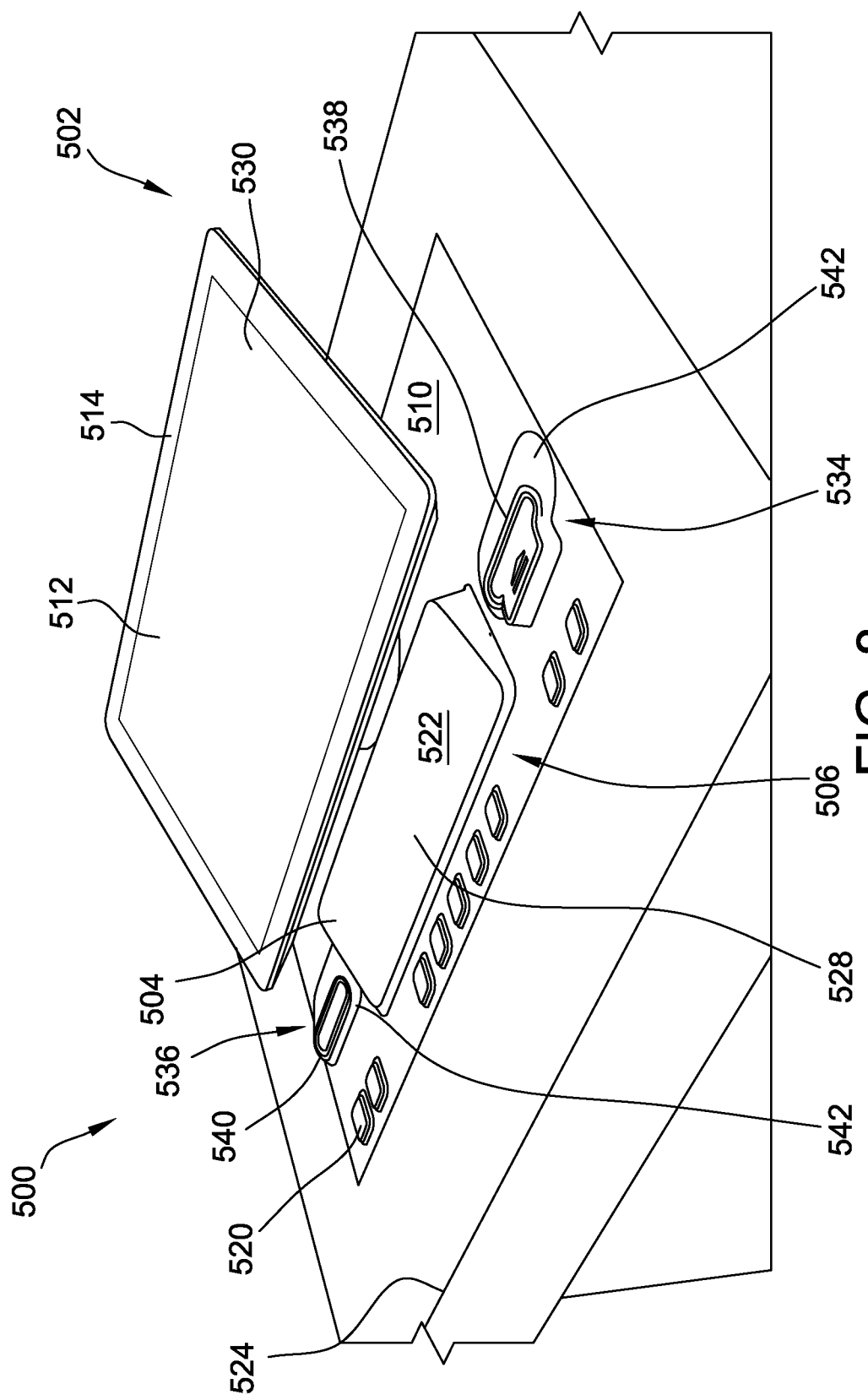
FIG. 8 is a front perspective view of a fifth exemplary embodiment of a tabletop display having a panel in a first configuration.
Figure 9:
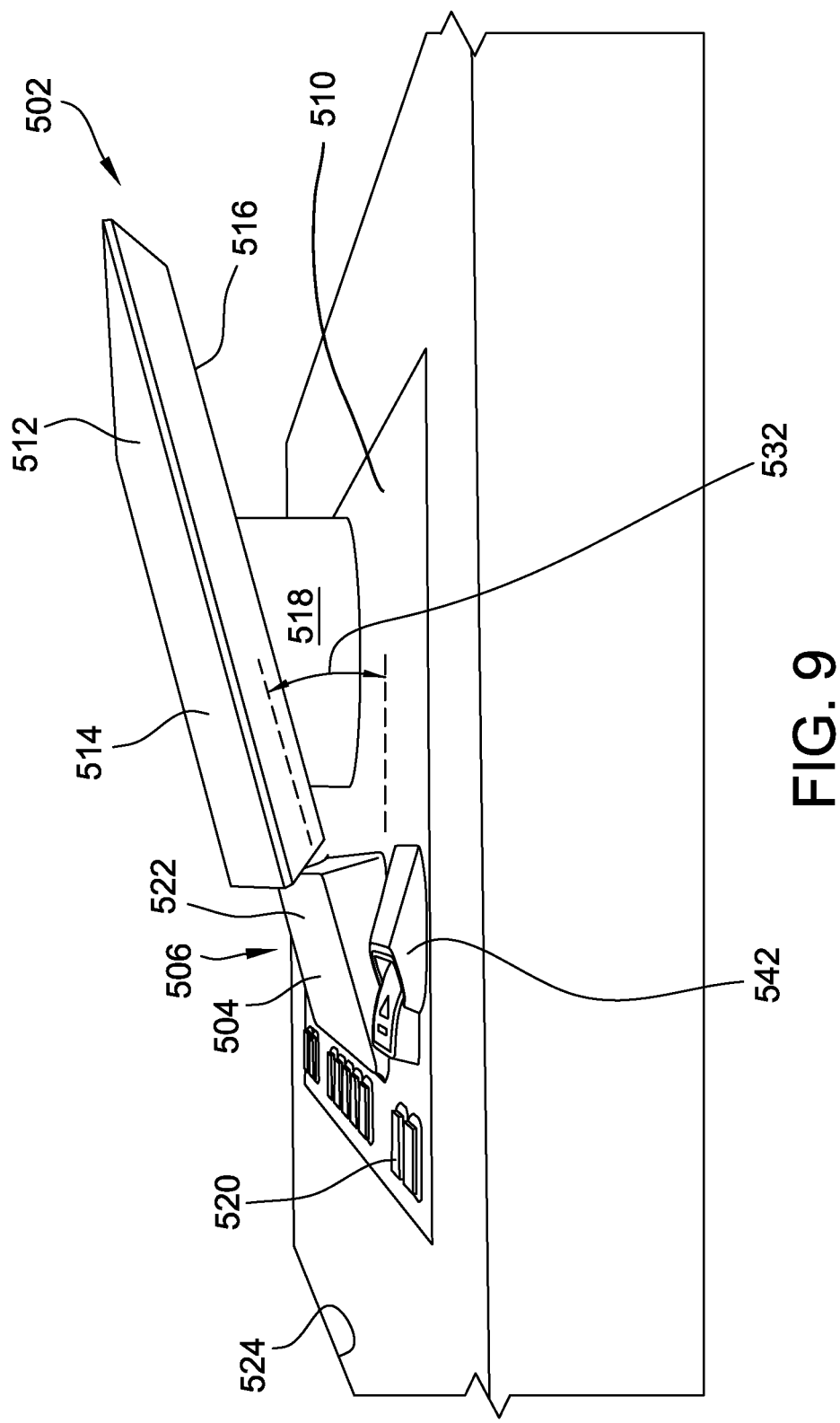
FIG. 9 is a side view of the tabletop display shown in FIG. 8.
Figure 10:
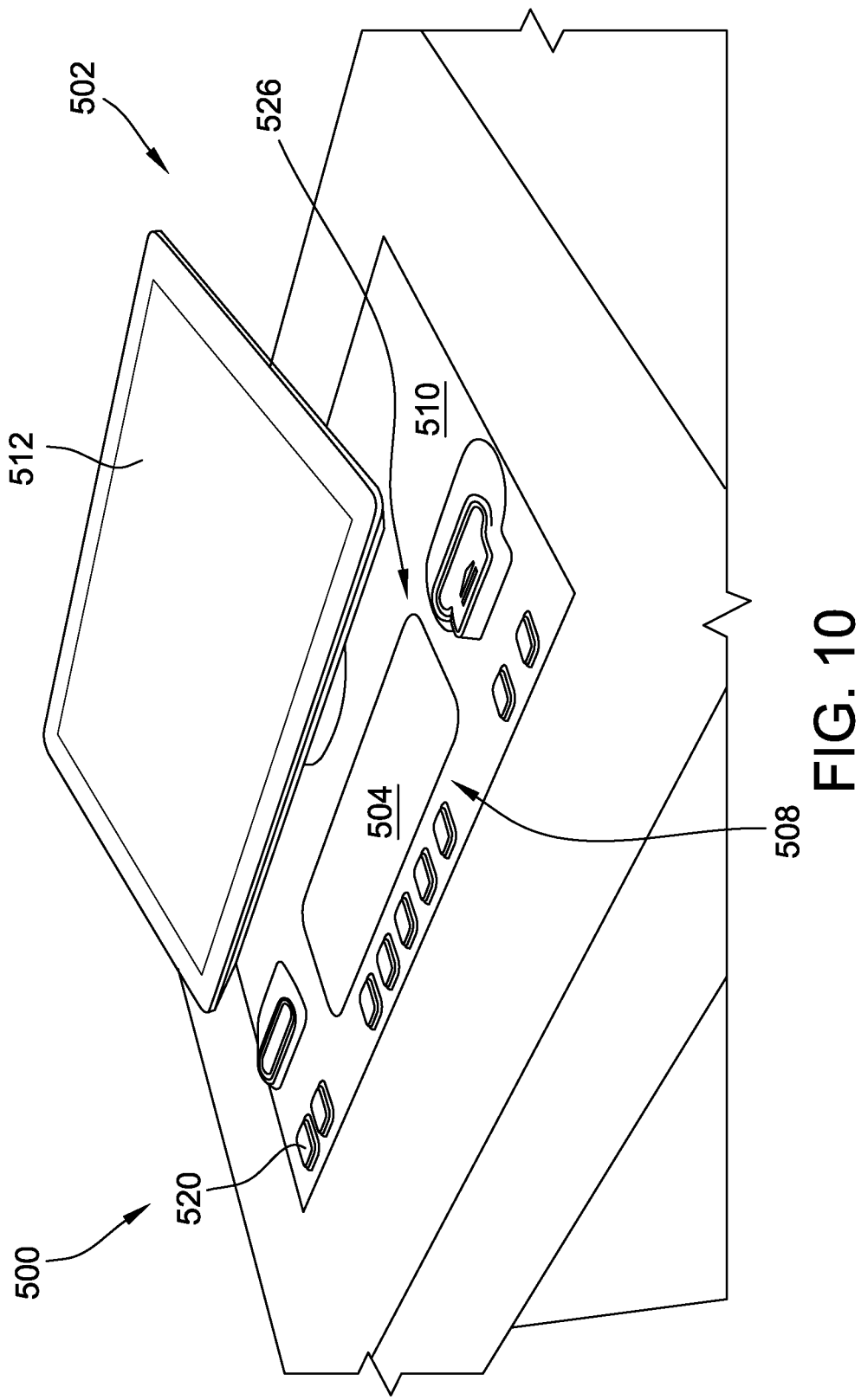
FIG. 10 is a front perspective view of the tabletop display shown in FIG. 8 showing the panel in a second configuration.

FIG. 8 is a front perspective view of an exemplary tabletop gaming system 500 including an exemplary floating tabletop display 502 having a panel 504 in a first configuration 506. FIG. 9 is a side view of floating tabletop display 502, and FIG. 10 is a front perspective view of floating tabletop display 502 with panel 504 in a second configuration 508. Floating tabletop display 502 may be similar to floating tabletop display 102 (shown in FIGS. 1 and 2), floating tabletop display 202 (shown in FIGS. 3 and 4), floating tabletop display 302 (shown in FIGS. 5 and 6), and/or floating tabletop display 402 (shown in FIG. 7). Specifically, in the exemplary embodiment, floating tabletop display 502 includes a tabletop surface 510 and a monitor 512 spaced therefrom. Monitor 512 defines a front surface 514 and a back surface 516, where front surface 514 is generally a display surface and back surface 516 opposes front surface 514. Monitor 512 is spaced from tabletop surface 510 by a column 518 that extends between monitor back surface 516 and tabletop surface 510.

Additionally, tabletop surface 510 includes a plurality of buttons 520 for interaction with tabletop gaming system 500 by a user. In the illustrated embodiment, buttons 520 are embodied as traditional physical buttons. In one or more alternative embodiments, buttons 520 are embodied as virtual buttons, such as touch regions of a touch-screen display. Tabletop surface 510 also includes panel 504, which may be selectively transitioned between first configuration 506 (shown in FIGS. 8 and 9), in which panel 504 extends obliquely from tabletop surface 510, and second configuration 508 (shown in FIG. 10), in which panel 504 is substantially flush with tabletop surface 510. Panel 504 is positioned forward of column 518 and, in first configuration 506, is angled with respect to tabletop surface 510 such that a primary face 522 of panel 504 is oriented towards a front 524 of tabletop surface 510, or towards the player. In second configuration 508, primary face 522 of panel 504 is aligned with tabletop surface 510 to form a generally continuous or flat surface 526. In some embodiments, panel 504, specifically primary face 522 thereof, includes a secondary display 528, where monitor front surface 514 includes a primary display 530. Secondary display 528 may include one or more screens and/or one or more secondary display regions suitable to display at least one game (e.g., card games, reel-type games, etc.). Secondary display 528 may include one or more touch screen regions such that a user may interact with a game (shown on secondary display 528 and/or shown on primary display 530) via the touch screen region(s).

In some such embodiments, secondary display 522 is only active in one of first and second configurations 506, 508 (e.g., only in first configuration 506). In other embodiments, panel 504 may include a cover (not specifically shown) or other protective element configured to overlie secondary display 528 when panel 504 is in second configuration 508. In certain embodiments, panel 504 may be selectively transitioned between first configuration 506 and second configuration 508 and/or to any intermediate configuration. For example, panel 504 forms an angle 532 with tabletop surface 510 in first configuration 506. In an intermediate configuration (not shown), panel 504 may form any other angle less than angle 532 with tabletop surface 510. A player may have access to a control to adjust the configuration of panel 504, for instance, to an angle that suits their preference (e.g., reduces a glare on primary face 522, is more suited for a particular player's height, etc.).

Floating tabletop display 502 also includes an input mechanism 534 and an output mechanism 536, as described herein. In the exemplary embodiment, input mechanism 534 and output mechanism 536 are arranged on tabletop surface 510. An input aperture 538 of input mechanism 534 and an output aperture 540 of output mechanism 536 are raised above tabletop surface 510 by respective projections or ridges 542 that extend above tabletop surface 510. In other words, in the exemplary embodiment, input and output apertures 538, 540 are not coupled to panel 504. Moreover, in the exemplary embodiment, projections 542 are oriented such that input and output apertures 538, 540 are angled obliquely with respect to horizontal tabletop surface 510.

Figure 11:
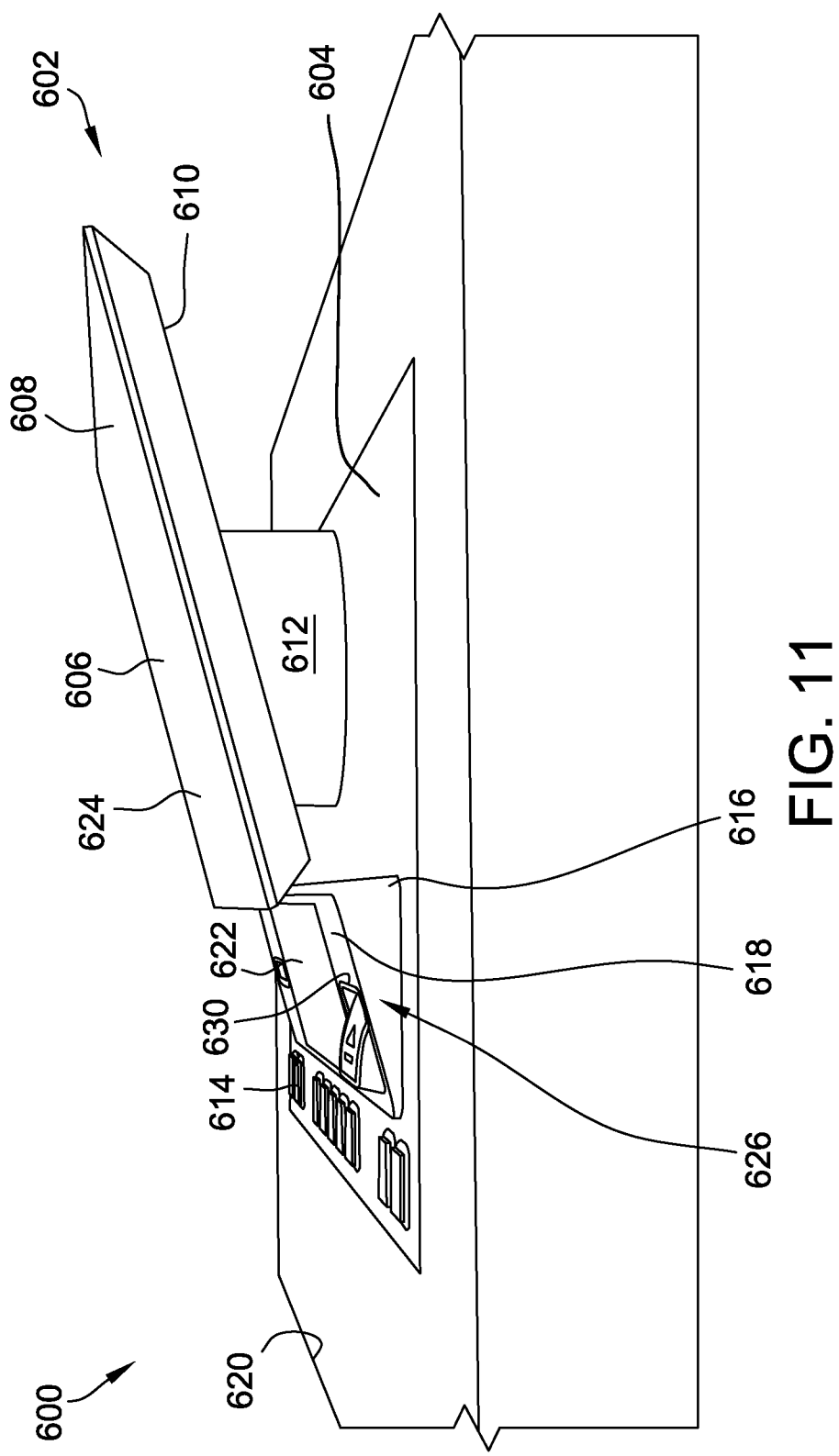
FIG. 11 is a side view of a sixth exemplary tabletop display.

FIG. 11 is a front perspective view of an exemplary tabletop gaming system 600 including an exemplary floating tabletop display 602. Floating tabletop display 602 may be similar to floating tabletop display 102 (shown in FIGS. 1 and 2), floating tabletop display 202 (shown in FIGS. 3 and 4), floating tabletop display 302 (shown in FIGS. 5 and 6), floating tabletop display 402 (shown in FIG. 7), and/or floating tabletop display 502 (shown in FIGS. 8-10). Specifically, in the exemplary embodiment, floating tabletop display 602 includes a tabletop surface 604 and a monitor 606 spaced therefrom. Monitor 606 defines a front surface 608 and a back surface 610, where front surface 608 is generally a display surface and back surface 610 opposes front surface 608. Monitor 606 is spaced from tabletop surface 604 by a column 612 that extends between monitor back surface 610 and tabletop surface 604.

Tabletop surface 604 includes a plurality of buttons 614 for interaction with tabletop gaming system 600 by a user. In the illustrated embodiment, buttons 614 are embodied as traditional physical buttons. In one or more alternative embodiments, buttons 614 are embodied as virtual buttons, such as touch regions of a touch-screen display. In addition, tabletop surface 604 includes a panel 616 extending obliquely therefrom. More particularly, panel 616 is positioned forward of column 612 and is angled with respect to tabletop surface 604 such that a primary face 618 of panel 616 is oriented towards a front 620 of tabletop surface 604, or towards the player. In the exemplary embodiment, panel 616, specifically primary face 618 thereof, further includes a secondary display 622, where monitor front surface 608 defines a primary display 624. Secondary display 622 may include one or more screens and/or one or more secondary display regions suitable to display at least one game (e.g., card games, reel-type games, etc.). Secondary display 622 may include one or more touch screen regions such that a user may interact with a game (shown on secondary display 622 and/or shown on primary display 624) via the touch screen region(s).

Floating tabletop display 602 also includes an input mechanism 626 and an output mechanism (not shown in the view of FIG. 11), as described herein. In the exemplary embodiment, input mechanism 626 and the output mechanism are coupled to panel 616. More particularly, an input aperture 630 of input mechanism 626 and an output aperture (also not shown in the view of FIG. 11) of the output mechanism are defined in primary face 618 of panel 616. As such, input aperture 630 and the output aperture are raised above tabletop surface 604.

Figure 12:
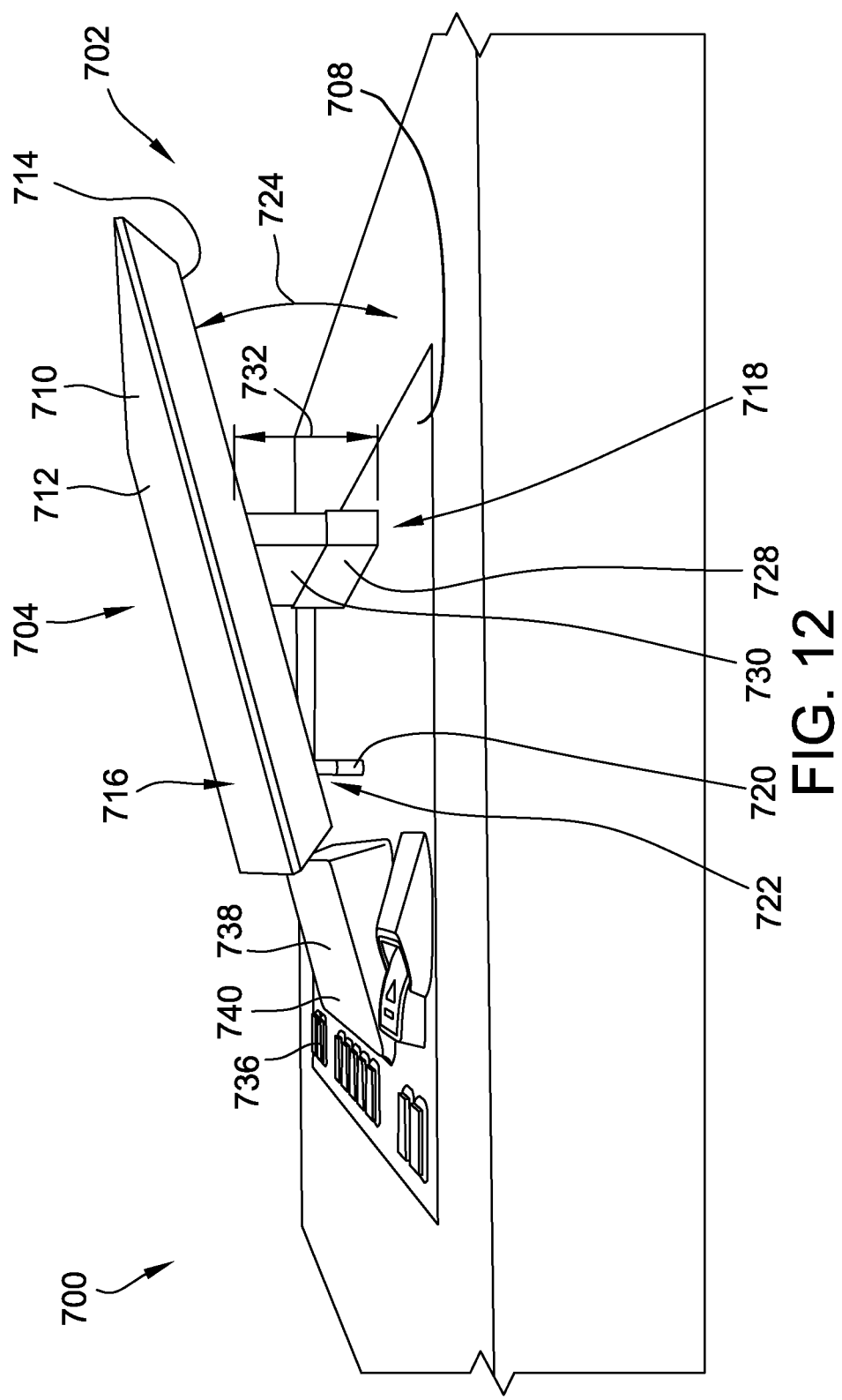
FIG. 12 is a side view of a seventh exemplary tabletop display in a first position.
Figure 13:
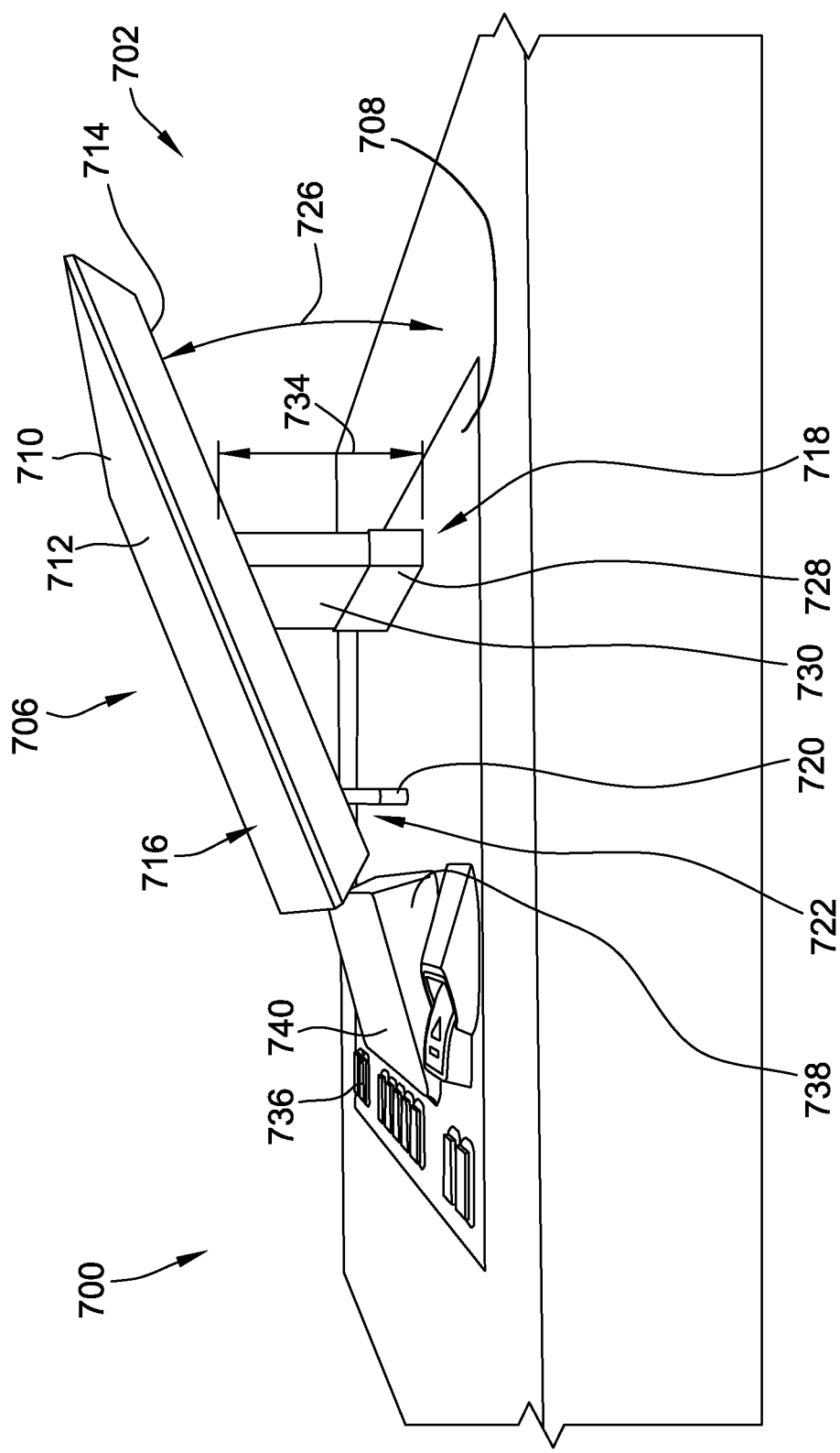
FIG. 13 is a side view of the tabletop display shown in FIG. 12 in a second position.

FIG. 12 is a side view of an exemplary tabletop gaming system 700 including an exemplary floating tabletop display 702 in a first position 704. FIG. 13 is a side view of floating tabletop display 702 in a second position 706. In the exemplary embodiment, floating tabletop display 702 includes a tabletop surface 708 and a monitor 710 spaced therefrom. Monitor 710 defines a front surface 712 and a back surface 714, where front surface 712 is generally a display surface and back surface 714 opposes front surface 712. More specifically, front surface 712 includes a display 716 that may include one or more screens and/or one or more display regions suitable to display at least one game (e.g., card games, reel-type games, etc.). Display 716 may include one or more touch screen regions such that a user may interact with the game via the touch screen region(s).

Monitor 710 is spaced from tabletop surface 708 by a column 718 that extends from monitor back surface 714 to tabletop surface 708. In the illustrated embodiment, column 718 may be made from any suitable material that may withstand a weight of monitor 710 as well as additional force applied by a user when interacting with monitor 710 (e.g., touching display 716, leaning on monitor 710, etc.). In the exemplary embodiment, floating tabletop display 702 further includes a stem 720 extending between monitor back surface 714 and tabletop surface 708. Stem 720 defines a pivot point or pivot axis 722 about which monitor 710 is selectively pivotable with respect to tabletop surface 708. Specifically, monitor 710 is selectively adjustable between first position 704 (shown in FIG. 12), in which monitor 710 is angled at a first angle 724 with respect to tabletop surface 708, and second position 706 (shown in FIG. 13), in which monitor 710 is angled at a second angle 726 with respect to tabletop surface 708. Column 718 includes a foot 728 and a telescoping portion 730. Telescoping portion 730 is sized and oriented with respect to foot 728 such that telescoping portion 730 is selectively adjustable between a first length 732, corresponding to monitor first position 704, and a second length 734, corresponding to monitor second position 706. Adjusting a relative length of telescoping portion 730 adjusts a relative position of monitor 710.

In certain embodiments, monitor 710 may be selectively pivoted from first position 704 to second position 706 and/or to any intermediate position between or beyond the illustrated first and second positions 704, 706. In other words, the angle between monitor 710 and tabletop surface 708 may be any angle between 0° and 90°, or between 10° and 80°, or between any suitable range (that may be limited by the configuration of telescoping portion 730 and foot 728). In some embodiments, the position of monitor 710 is adjusted by a player, using one or more controls available to the player at floating tabletop display 702 (e.g., a control on monitor 710, one of a plurality of buttons 736, a control on a panel 738 or a secondary display 740). The player may adjust the angle of monitor 710, for instance, according to their preference (e.g., an angle that reduces a glare on front surface 712, an angle that is more suited for a particular player's height, etc.). Alternatively, the angle of monitor 710 may be selected by an installer or service technician, according to the particular environment of floating tabletop display 702. Although not shown, floating tabletop display 702 further includes any internal mechanical component(s) suitable to adjust the length of telescoping portion 730 (e.g., levers, pulleys, weights, rods, pistons, wheels, etc.).

Figure 14:
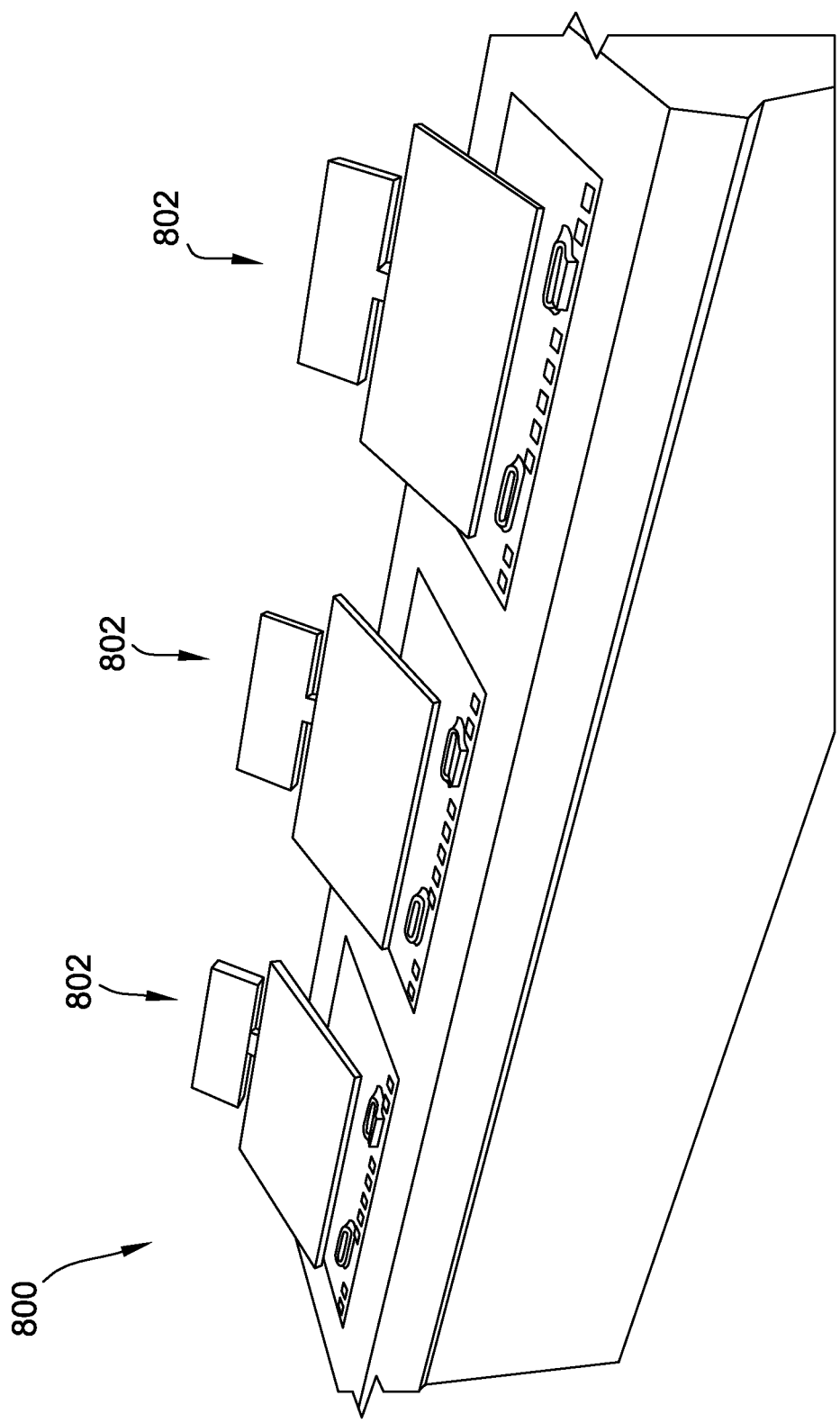
FIG. 14 is a front perspective view of a tabletop gaming system including a plurality of tabletop displays.

FIG. 14 is a front perspective view of an exemplary tabletop gaming system 800 including a plurality of floating tabletop displays 802. Each floating tabletop display 802 may be one of the floating tabletop displays 102, 202, 302, 402, 502, 602, and/or 702 shown and described herein or any variation thereof. Although three floating tabletop displays 802 are shown herein, it should be readily understood that tabletop gaming system 800 may include any number of floating tabletop displays 802 (or "stations"). Moreover, although each of floating tabletop displays 802 shown are substantially the same, it should be readily understood that one or more of floating tabletop displays 802 may be different from any other floating tabletop display 802.

Figure 15:
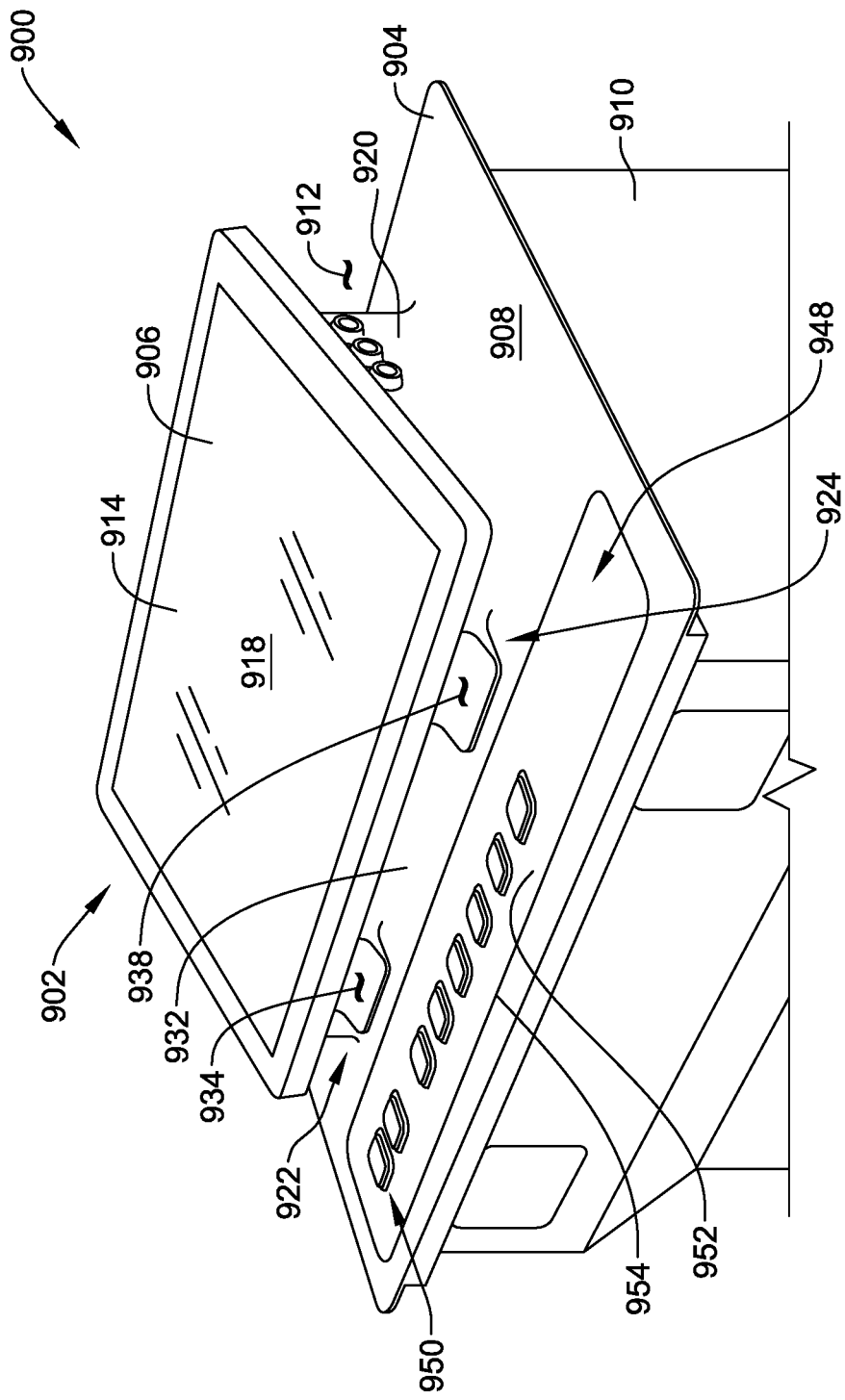
FIG. 15 is a front perspective view of an eighth exemplary tabletop display.
Figure 16:
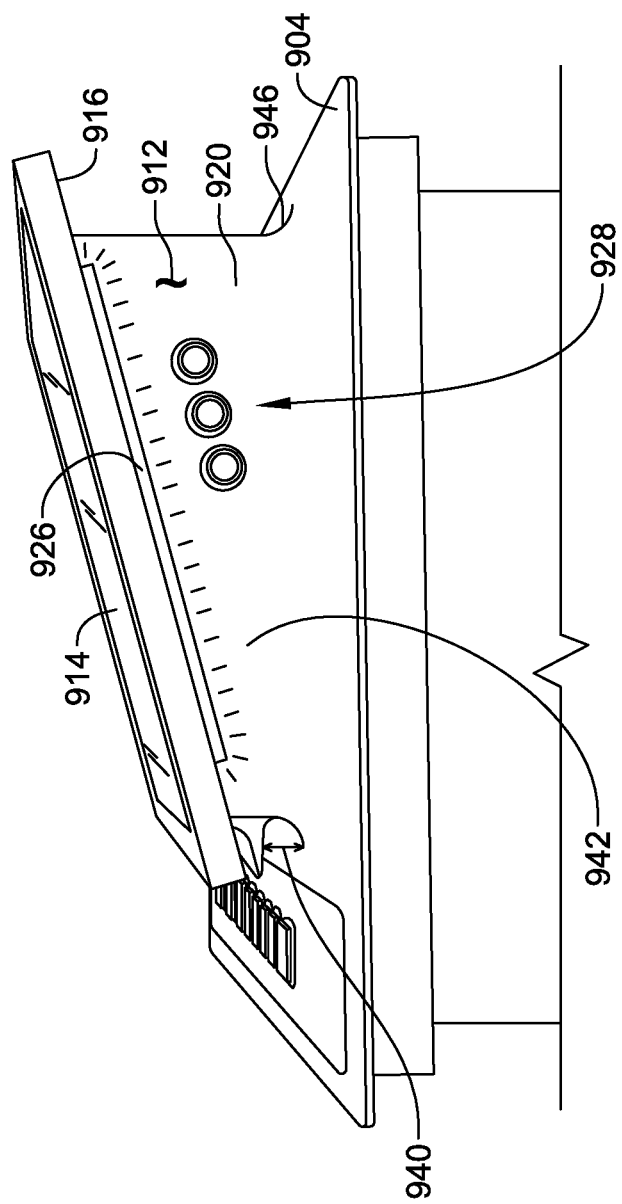
FIG. 16 is a first side view of the tabletop gaming display shown in FIG. 15.
Figure 17:
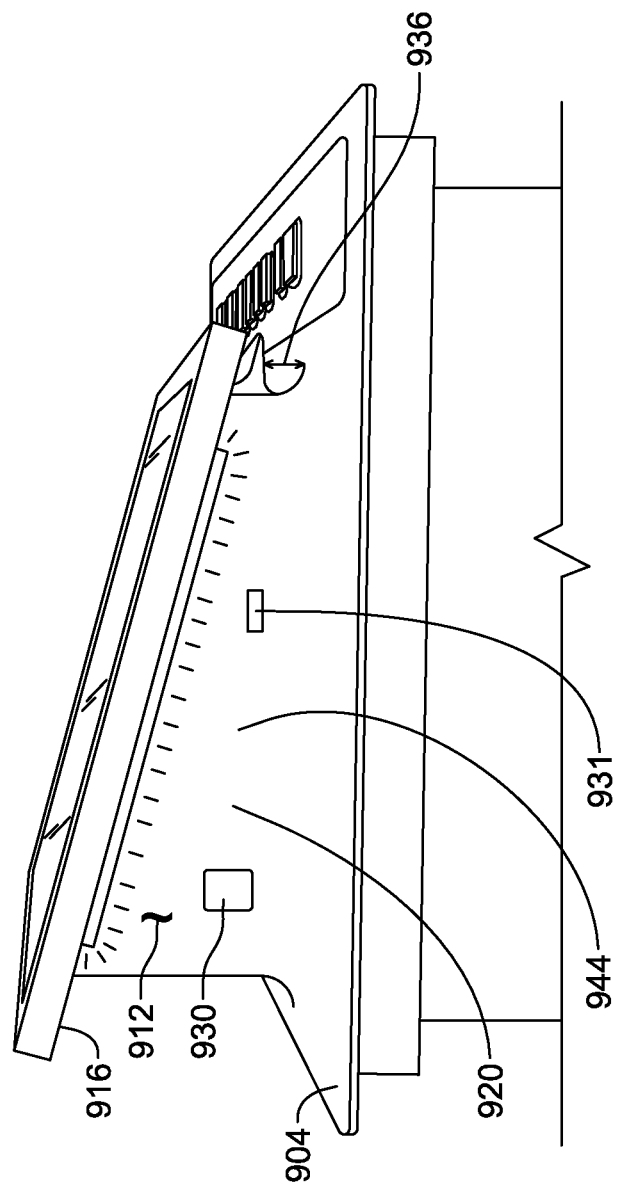
FIG. 17 is a second side view of the tabletop gaming display shown in FIG. 15.

FIG. 15 is a front perspective view of an exemplary tabletop gaming system 900 including an exemplary floating tabletop display 902. FIGS. 16 and 17 are side views of floating tabletop display 902. Floating tabletop display 902 may be similar to any other floating tabletop display described herein (such as those shown and described with respect to FIGS. 1-14). In the exemplary embodiment, floating tabletop display 902 includes a tabletop surface 904 and a monitor 906 spaced therefrom. In the exemplary embodiment, tabletop surface 904 is defined by a top surface 908 of a gaming machine base 910, as described herein. In particular, gaming system 900 does not include a frame therearound. Gaming system 900 has a footprint defined by gaming system base 910. In the exemplary embodiment, the footprint of gaming system 900 is substantially the same as a footprint of a traditional or existing gaming system (not shown) housed in a frame or bar, such that gaming system 900 may replace the traditional gaming system without having to update an existing frame or bar. Put another way, gaming system 900 may be retrofit into an existing frame or gaming "station". As such, the features described herein with respect to gaming system 900 (and/or other gaming systems described herein) distinguish gaming system 900 over existing gaming systems, such as an increased monitor size (e.g., a 23-inch monitor as opposed to a 19-inch monitor) and the availability of gaming system elements to be located in a space 912 (also referred to as an "empty space," "open space," or "throat" 912) between monitor 906 and tabletop surface 904.

Monitor 906 defines a front surface 914 and a back surface 916, where front surface 914 is generally a display surface and may be referred to as a "primary display surface." Back surface 916 opposes front surface 914. Front surface 914 includes a display 918 that may include one or more screens and/or one or more display regions suitable to display at least one game (e.g., card games, reel-type games, etc.). Display 918 may include one or more touch screen regions such that a player may interact with the game via the touch screen region(s).

Monitor 906 is spaced from tabletop surface 904 by a column 920 that extends from monitor back surface 916 to tabletop surface 904. Monitor 906 is angled obliquely with respect to tabletop surface 904, such the primary display surface defined by monitor front surface 914 is also angled obliquely with respect to the generally planar, horizontal tabletop surface 904. In the illustrated embodiment, column 920 may be made from any suitable material that may withstand a weight of monitor 906 as well as additional force applied by a user when interacting with monitor 906 (e.g., touching display 918, leaning on monitor 906, etc.). Column 920 is distinguished from an enclosure or housing that spans from monitor 906 to tabletop surface 904 in typical gaming systems. More particularly, spacing monitor 906 from tabletop surface 904 by column 920 makes throat 912, defined between monitor 906 and tabletop surface 904, accessible. As shown and described herein, a plurality of gaming system elements are arranged within and about throat 912.

More particularly, in the example embodiment, an input mechanism 922, an output mechanism 924, halo lighting 926, lock switches 928, and a service switch 930 are all arranged in space 912. Input mechanism 922 and output mechanism 924 are each arranged in a front surface 932 of column 920. Specifically, an input aperture 934 of input mechanism 922 is defined in column front surface 932 at a distance 936 above tabletop surface 904, and an output aperture 938 of output mechanism 924 is defined in column front surface 932 at a distance 940 above tabletop surface 904. As such, liquid ingress into input aperture 934 and/or output aperture 938 (and, therefore, into the mechanics of input mechanism 922 and/or output mechanism 924) is inhibited or substantially prevented.

Halo lighting 926 is arranged within space 912 along monitor back surface 916. As described herein, halo lighting 926 (and/or other lighting devices of gaming system 900) may facilitate communicating certain status events to users of gaming system 900 and/or other persons in a vicinity thereof. As one particular example, halo lighting 926 can be controlled (e.g., by a player of gaming system 900) to display light of a certain color or intensity to communicate to a slot attendant or bartender (or other person) that the player is in need of service. Although halo lighting 926 is illustrated as extending from monitor back surface 916, in any alternative embodiment, halo lighting 926 may be embedded in and/or flush with monitor back surface 916 or a surface of column 920.

Lock switches 928 are arranged in a side surface 942 of column 920. In the exemplary embodiment, lock switches 928 include a monitor lock switch to open monitor 906 (as described further herein), a jackpot lockout switch to reset gaming system 900 after a jackpot award is won, and an audit lock switch to activate/deactivate gaming system 900. It should be readily understood that lock switches 928 may include additional, fewer, or alternative lock switches, and/or that lock switches 928 may be located on an alternative surface of column 920 or tabletop surface 904.

Service switch 930 is arranged in a side surface 944 of column 920. Service switch 930 may be a button or other control element(s) that enables an operator thereof, such as a bartender, to adjust one or more elements of gaming system 900. In one particular example, service switch 930 is engaged by a bartender to return halo lighting 926 to a default setting (or other setting) after performing a service requested by a player of gaming system 900, such as getting the player a drink. It should be readily understood that service switch 930 may be located on an alternative surface of column 920 or tabletop surface 904.

In some embodiments, a device charging port 931 is arranged in side surface 944 of column 920. In the exemplary embodiment, device charging port 931 includes a USB charging port, such that a user of gaming system 900 may plug their personal computing device (e.g., smart phone) into gaming system 900 to charge the personal computing device. It should be readily understood that device charging port 931 may be any other suitable port and/or that device charging port 931 may be located on an alternative surface of column 920 or tabletop surface 904.

In the exemplary embodiment, column 920 is formed integrally with tabletop surface 904. In other words, there are no breaks, seams, or gaps between a base or foot 946 of column 920 and tabletop surface 904. To access an interior (not shown) of gaming system 900, an operator or service technician may open monitor 906 or remove a button deck 948 (described further herein). "Opening monitor 906," as used herein, refers to unlocking monitor 906 (e.g., using one of lock switches 928) and rotating monitor 906 away from tabletop surface 904 about a hinge point (not specifically shown) defined at a point of contact between monitor 906 and column 920 (e.g., along a front, back, or side top edge of column 920). In the exemplary embodiment, therefore, the opening to the interior of gaming system 900 is spaced from tabletop surface 904 by a distance defined by a surface of column 920 (specifically, a height of the shortest surface of column 920, such as column front surface 932 in the illustrated embodiment). As such, liquid or debris ingress into gaming system 900 is inhibited or substantially prevented. In some embodiments, "opening monitor 906" may further refer to complete removal or detachment of monitor 906 from column 920, for example, for service or replacement of monitor 906 or any component thereof (e.g., display 918).

Button deck 948 includes a plurality of buttons 950 defined in and/or coupled to a planar plate 952. Plate 952 is seated in an opening 954 of tabletop surface 904 and is co-planar with tabletop surface 904. As described herein with respect to FIGS. 3 and 4, gaming system 900 may further include a drain system arranged on an interior thereof to catch any liquids or debris that enters a seam 956 defined between plate 952 and tabletop surface 904. Button deck 948 may include at least one latch mechanism (not shown) that securely couples plate 952 to tabletop surface 904 (or another element of gaming system 900). A service technician may unlock the latch mechanism to de-couple button deck 948 from tabletop surface 904 for removal, service, and/or replacement thereof, or to access or clean the drain system of gaming system 900.

It should also be readily understood that although several embodiments of a floating tabletop display have been shown and described, a floating tabletop display may include any combination of the features of any one or more embodiments, without departing from the scope of the disclosure. It should be understood that the floating tabletop display(s) may be implemented in substantially any gaming environment, such as casinos or bar environments offering gaming.

The tabletop gaming systems including floating tabletop displays described herein extend and suspend the monitor above the tabletop surface using a column. Such an arrangement exposes a space or throat between the monitor and the tabletop surface, which enables the relocation of several elements of a gaming device, including (but not limited to) input mechanism(s), output mechanism(s), lighting device(s), player tracking device(s), display(s), and/or button(s), to varying positions on a tabletop gaming system. The embodiments shown and described illustrate the flexibility and variety of the positioning of these elements that becomes available when the monitor is spaced from the tabletop surface. Moreover, a greater area of the monitor is available to use as a display surface, as there is no bulky housing surrounding the monitor. The monitor itself is also not restricted in size or orientation by any housing.

The systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems and/or methods as described herein.

Although the present disclosure is described in connection with an exemplary gaming system environment, embodiments of the present disclosure are operational with numerous other general purpose or special purpose gaming system environments or configurations. The gaming system environment is not intended to suggest any limitation as to the scope of use or functionality of any aspect of the disclosure. Moreover, the gaming system environment should not be interpreted as having any dependency or requirement relating to any one or combination of components illustrated in the exemplary operating environment.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tabletop display comprising:
   a tabletop surface;
   a monitor spaced from the tabletop surface and angled obliquely with respect to the tabletop surface, the monitor defines a front, display surface and an opposing back surface;
   a column extending from the tabletop surface to the back surface of the monitor, wherein the back surface of the monitor extends from an outside edge of the column to an outside edge of the monitor, wherein the column is an extension of the tabletop surface;
   an input mechanism comprising an input aperture spaced a distance above the tabletop surface and attached to the column, and wherein the input aperture oriented obliquely with respect to the display surface; and an output mechanism comprising an output aperture spaced a distance above the tabletop surface and attached to the column in lateral side-by-side relation to the input mechanism, and wherein the output aperture oriented obliquely with respect to the display surface.

2. The tabletop display of claim 1, wherein the tabletop surface comprises a plurality of buttons.

3. The tabletop display of claim 1 further comprising a player tracking device coupled to at least one of the monitor and the column.

4. The tabletop display of claim 1, wherein the input aperture is defined in a front surface of the column.

5. The tabletop display of claim 4, wherein the monitor extends in a forward direction beyond the front surface of the column, such that the monitor extends forwardly at least partially beyond the input mechanism.

6. The tabletop display of claim 1, wherein the output aperture is defined in a front surface of the column.

7. The tabletop display of claim 1, wherein the monitor extends in a forward direction beyond a front surface of the column, such that the monitor extends forwardly at least partially beyond the output mechanism.

8. The tabletop display of claim 1 further comprising a panel extending obliquely from the tabletop surface forward of the column.

9. The tabletop display of claim 8, wherein the input mechanism is coupled to the panel.

10. The tabletop display of claim 8, wherein the output mechanism is coupled to the panel.

11. The tabletop display of claim 8, wherein the monitor comprises a primary screen and the panel comprises a secondary screen.

12. The tabletop display of claim 1, wherein the monitor comprises a primary display screen and the tabletop surface comprises a secondary display screen defined therein.

13. The tabletop display of claim 1, wherein the monitor includes a first monitor, the tabletop display further comprising a plurality of monitors including the first monitor, each monitor of the plurality of monitors spaced from and angled obliquely with respect to the tabletop surface.

14. The tabletop display of claim 1 further comprising at least one lighting device coupled to the back surface of the monitor.

15. The tabletop display of claim 14 further comprising at least one control for changing a lighting output of the at least one lighting device.

16. The tabletop display of claim 1, wherein the monitor extends in a forward direction beyond a front surface of the column, such that the monitor extends forwardly at least partially beyond at least one of the input mechanism and the output mechanism.

17. The tabletop display of claim 1, wherein the monitor is adjustable between a first position in which the monitor is angled at a first angle with respect to the tabletop surface and a second position in which the monitor is angled at a second angle with respect to the tabletop surface.

18. The tabletop display of claim 17, further comprising a pivot point coupled to the monitor, wherein the column includes a telescoping portion that is selectively adjustable between a first length corresponding to the first position of the monitor and a second length corresponding to the second position of the monitor.

19. The tabletop display of claim 17, wherein the monitor comprises a display screen operable to display a game when the monitor is in the first position and the second position.

20. The tabletop display of claim 1, the input mechanism comprising at least one of a coin input chute, a bill validator, a ticket reader, and a card reader.

21. The tabletop display of claim 1, the output mechanism comprising at least one of a coin tray, a bill dispenser, and a ticket printer.

22. The tabletop display of claim 1, wherein the column supports and prevents movement of the monitor.

23. A tabletop display comprising:
a tabletop surface;
a monitor spaced from the tabletop surface and angled obliquely with respect to the tabletop surface, the monitor defines a front, display surface and an opposing back surface;
a column extending from the tabletop surface to the back surface of the monitor, wherein the column is an extension of the tabletop surface;
an input mechanism spaced a distance above the tabletop surface and attached to the extension of the horizontal base top surface, wherein the input mechanism comprises an input aperture oriented obliquely with respect to the display surface;
an output mechanism spaced a distance above the tabletop surface and attached to the extension of the horizontal base top surface lateral side-by-side relation to the input mechanism, wherein the output mechanism comprises an output aperture oriented obliquely with respect to the display surface;
at least one lighting device coupled to the back surface of the monitor and positioned between an outside edge of the column and an outside edge of the monitor; and
at least one control for adjusting a lighting output of the lighting device.

24. A gaming machine comprising:
a base having a horizontal base top surface coplanar with a top surface of a frame surrounding the base;
a primary display surface spaced a distance from the base top surface and oriented obliquely with respect to the base top surface, wherein the primary display surface is further spaced to define an exterior volume of empty space between the base top surface and a back surface of the primary display surface, wherein the base top surface and the back surface of the primary display surface are spaced by an extension of the horizontal base top surface;
an input mechanism spaced a distance above the base top surface and attached to the extension of the horizontal base top surface, wherein the input mechanism comprises a projection extending from the at least one of the frame top surface and the base top surface such that an input aperture is angled obliquely with respect to the at least one of the frame top surface and the base top surface; and
an output mechanism spaced a distance above the base top surface and attached to the extension of the horizontal base top surface lateral side-by-side relation to the input mechanism, wherein the input mechanism comprises a projection extending from the at least one of the frame top surface and the base top surface such that an input aperture is angled obliquely with respect to the at least one of the frame top surface and the base top surface.

25. The gaming machine of claim 24 further comprising a panel extending obliquely from the at least one of the base top surface and the frame top surface, the at least of the input mechanism and the output mechanism defined in the panel.

26. The gaming machine of claim 24, wherein a front edge of the primary display surface extends in a forward direction beyond at least a portion of the at least one of the input mechanism and the output mechanism.

27. A gaming machine comprising:
- a base having a horizontal base top surface coplanar with a top surface of a frame surrounding the base;
- a primary display surface spaced a distance from the base top surface by a column, the primary display surface oriented obliquely with respect to the base top surface, wherein the primary display surface is further spaced to define an exterior volume of empty space between the base top surface and a back surface of the primary display surface, wherein the column is an extension of the horizontal base top surface;
- an input mechanism spaced a distance above the base top surface and attached to the column, wherein the input mechanism comprises an input aperture oriented obliquely with respect to the primary display surface; and
- an output mechanism spaced a distance above the base top surface and attached to the column lateral side-by-side relation to the input mechanism, wherein the output mechanism comprises an output aperture oriented obliquely with respect to the primary display surface.

28. The gaming machine of claim 27, the input mechanism comprising an input aperture oriented obliquely with respect to the primary display surface.

29. The gaming machine of claim 27, the input mechanism comprising an output aperture oriented obliquely with respect to the primary display surface.

30. The gaming machine of claim 27, wherein a front edge of the primary display surface extends in a forward direction beyond at least a portion of the at least one of the input mechanism and the output mechanism.

31. A method of retrofitting a gaming system, the method comprising:
- removing a first gaming machine from a gaming system frame, the first gaming machine including a first base defining a first footprint of the first gaming machine in a tabletop surface; and
- inserting a second gaming machine into the gaming system frame, the second gaming machine including a second base defining a second footprint of the second gaming machine, the second footprint the same as the first footprint, and a base top surface coplanar with a top surface of the gaming system frame, the second gaming machine further including a monitor extending a distance above the base top surface and spaced from the base top surface by a column, wherein a back surface of the monitor extends from an outside edge of the column to an outside edge of the monitor, wherein the column is an extension of the base top surface, wherein an input mechanism extends from the column a distance above the base top surface and an output mechanism extends from the column a distance above the base top surface, wherein the input mechanism lateral side-by-side relation to the output mechanism, wherein the input mechanism includes an input aperture oriented obliquely with respect to a monitor surface, and wherein the output mechanism includes an output aperture oriented obliquely with respect to the monitor surface.

* * * * *